(12) United States Patent
Kitahara et al.

(10) Patent No.: US 10,594,419 B2
(45) Date of Patent: Mar. 17, 2020

(54) RECEIVING APPARATUS, TRANSMITTING APPARATUS, AND DATA PROCESSING METHOD

(71) Applicant: SONY CORPORATION, Tokyo (JP)

(72) Inventors: Jun Kitahara, Shizuoka (JP); Naohisa Kitazato, Shizuoka (JP); Yasuaki Yamagishi, Kanagawa (JP); Taketoshi Yamane, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/742,664

(22) PCT Filed: Sep. 2, 2016

(86) PCT No.: PCT/JP2016/075748
§ 371 (c)(1),
(2) Date: Jan. 8, 2018

(87) PCT Pub. No.: WO2017/047397
PCT Pub. Date: Mar. 23, 2017

(65) Prior Publication Data
US 2018/0205473 A1 Jul. 19, 2018

(30) Foreign Application Priority Data

Sep. 14, 2015 (JP) .................... 2015-180785

(51) Int. Cl.
*H04N 21/235* (2011.01)
*H04N 21/435* (2011.01)
(Continued)

(52) U.S. Cl.
CPC ............ *H04H 20/59* (2013.01); *G08B 25/08* (2013.01); *H04H 20/28* (2013.01); *H04H 60/13* (2013.01);
(Continued)

(58) Field of Classification Search
CPC ............ H04N 21/814; H04N 21/4882; H04N 21/41415; H04N 21/4524; H04N 21/4622;
(Continued)

(56) References Cited

U.S. PATENT DOCUMENTS

2010/0186029 A1* 7/2010 Kim ..................... G08B 27/005
725/33
2012/0030703 A1* 2/2012 Strong .................. H04H 20/59
725/33

(Continued)

FOREIGN PATENT DOCUMENTS

JP 2015-80172 A 4/2015
JP 2015-104055 A 6/2015
(Continued)

OTHER PUBLICATIONS

International Search Report dated Oct. 25, 2016 in PCT/JP2016/075748, 2 pages.

(Continued)

*Primary Examiner* — Pankaj Kumar
*Assistant Examiner* — Alazar Tilahun
(74) *Attorney, Agent, or Firm* — Oblon, McClelland, Maier & Neustadt, L.L.P.

(57) ABSTRACT

The present technology relates to a receiving apparatus, a transmitting apparatus, and a data processing method which are capable of providing detailed information of emergency information that is to be announced in case of emergency. The receiving apparatus receives a digital broadcast signal, and performs a process with respect to an emergency information application for presenting detailed information of emergency information on the basis of control information that is included in the digital broadcast signal and that includes information about the detailed information of the
(Continued)

emergency information which needs to be announced urgently. The present technology is applicable to a television receiver, for example.

17 Claims, 29 Drawing Sheets

(51) Int. Cl.
*H04H 20/00* (2009.01)
*H04H 20/59* (2008.01)
*H04H 60/13* (2008.01)
*G08B 25/08* (2006.01)
*H04H 20/28* (2008.01)
*H04H 60/82* (2008.01)
*H04H 20/91* (2008.01)

(52) U.S. Cl.
CPC .......... *H04H 60/82* (2013.01); *H04N 21/235* (2013.01); *H04N 21/435* (2013.01); *H04H 20/91* (2013.01)

(58) Field of Classification Search
CPC .. H04N 21/488; H04N 21/435; H04N 21/235; H04H 20/59; H04H 20/28; H04H 60/82; H04H 60/13; H04H 20/91; G08B 25/08
See application file for complete search history.

(56) References Cited

U.S. PATENT DOCUMENTS

| 2012/0082266 | A1 | 4/2012 | Kitazato et al. |
| 2013/0242847 | A1* | 9/2013 | Oh ........................ H04L 1/0041 370/312 |
| 2013/0268761 | A1 | 10/2013 | Giladi |
| 2014/0280750 | A1 | 9/2014 | Panje et al. |
| 2015/0189486 | A1* | 7/2015 | Lee ......................... H04W 4/06 370/259 |
| 2016/0198023 | A1* | 7/2016 | Kwon ................. H04L 61/2007 370/474 |

FOREIGN PATENT DOCUMENTS

| JP | 2015-126328 A | 7/2015 |
| WO | 2015/079658 A1 | 6/2015 |

OTHER PUBLICATIONS

The extended European search report dated March 26, 2019 in corresponding EP Application No. 16846268.7 (6 pages).
The extended European search report dated Mar. 26, 2019 in corresponding EP Application No. 16846268.7 (6 pages).

* cited by examiner

FIG. 5

| PROCEDURE | APPLICATION RELATION | SUMMARY |
|---|---|---|
| 1 | EMERGENCY ALERT APPLICATION (EAA) IS ACTIVATED BY RESIDENT APPLICATION (RA) | IN CASE E-AIT (autostart) IS RECEIVED WHILE BROADCAST PROGRAM IS VIEWED, RESIDENT APPLICATION (RA) DISPLAYS ICON, ETC. INDICATING THAT DETAILED INFORMATION OF EMERGENCY ALERT IS RECEIVED ACCORDING TO E-AIT (autostart). HAVING CONFIRMED DISPLAYED INFORMATION, USER DETERMINES WHETHER TO DISPLAY DETAILED INFORMATION OF EMERGENCY ALERT OR NOT. IF USER HAS INDICATED ITS DISPLAY, EMERGENCY ALERT APPLICATION (EAA) IS EXECUTED, DISLAYING DETAILED INFORMATION OF EMERGENCY ALERT. IN CASE E-AIT (terminate) IS RECEIVED THEREAFTER, RESIDENT APPLICATION (RA) TERMINATES EMERGENCY ALERT APPLICATION (EAA) ACCORDING TO E-AIT. |
| 2 | EMERGENCY ALERT APPLICATION (EAA) IS ACTIVATED WHILE BROADCAST APPLICATION (BCA) IS NOT EXECUTED | IN CASE E-AIT (autostart) IS RECEIVED WHILE BROADCAST PROGRAM IS VIEWED, MIDDLEWARE, BROWSER, ETC. EXECUTES EMERGENCY ALERT APPLICATION (EAA) ACCORDING TO E-AIT (autostart), DISPLAYING DETAILED INFORMATION OF EMERGENCY ALERT. IN CASE E-AIT (terminate) IS RECEIVED THEREAFTER, MIDDLEWARE, BROWSER, ETC. TERMINATES EMERGENCY ALERT APPLICATION (EAA) ACCORDING TO E-AIT. |
| 3 | EMERGENCY ALERT APPLICATION (EAA) IS ACTIVATED WHILE BROADCAST APPLICATION (BCA) IS EXECUTED | IN CASE E-AIT (autostart) IS RECEIVED WHEN BROADCAST APPLICATION (BCA) IS ACTIVATED WHILE BROADCAST PROGRAM IS VIEWED, MIDDLEWARE, BROWSER, ETC. EXECUTES EMERGENCY ALERT APPLICATION (EAA) ACCORDING TO E-AIT, DISPLAYING DETAILED INFORMATION OF EMERGENCY ALERT. AT THIS TIME, ACTIVATED BROADCAST APPLICATION (BCA) IS TEMPORARILY SUSPENDED (TERMINATED). IN CASE E-AIT (terminate) IS RECEIVED THEREAFTER, MIDDLEWARE, BROWSER, ETC. TERMINATES EMERGENCY ALERT APPLICATION (EAA) ACCORDING TO E-AIT. IF THERE IS TEMPORARILY SUSPENDED BROADCAST APPLICATION (BCA), EXECUTION OF BROADCAST APPLICATION (BCA) IS RESUMED. EMERGENCY ALERT APPLICATION (EAA) CAN BE UPDATED USING EVENT MESSAGE. |

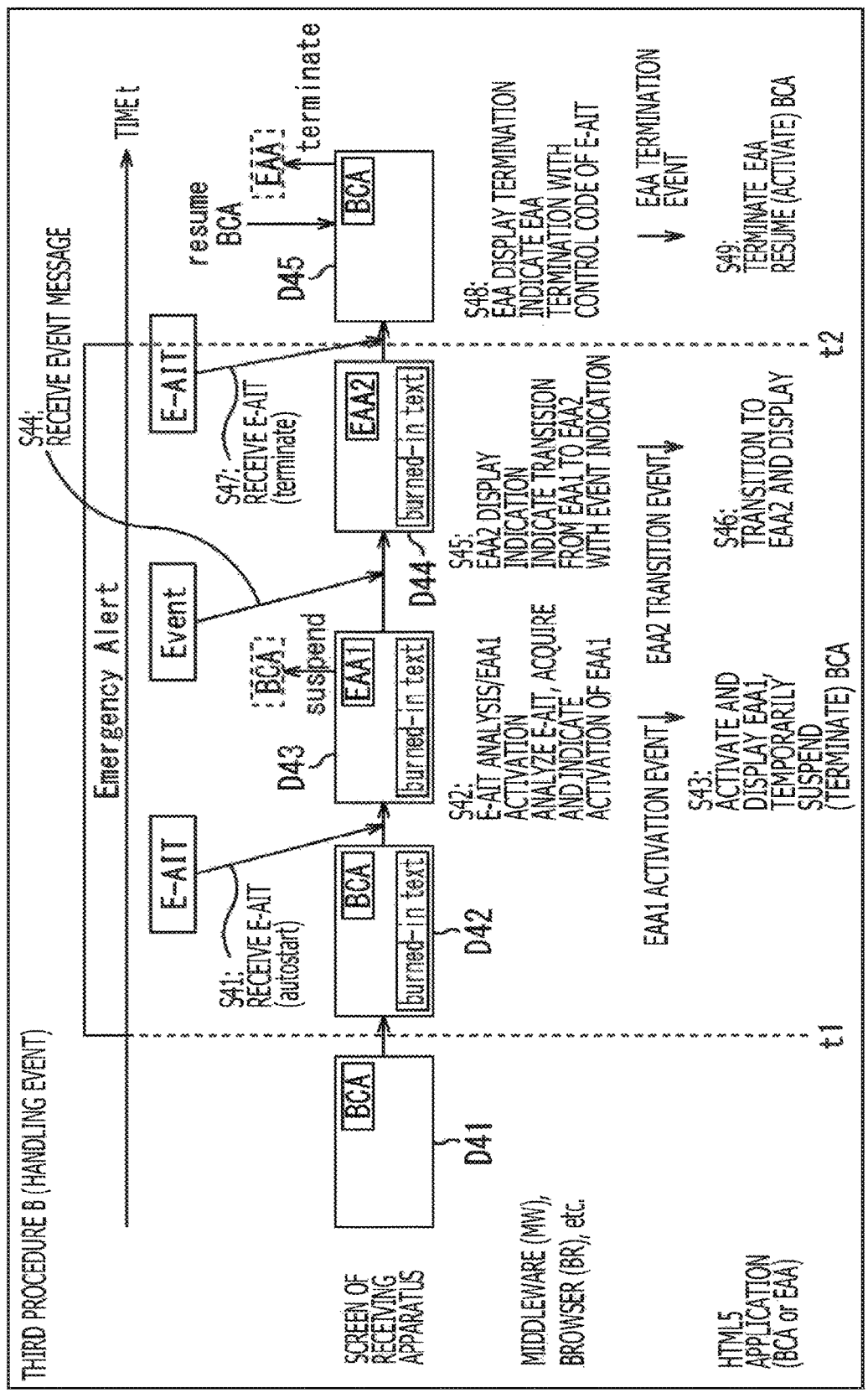

FIG. 10

| Element/Attribute(with @) | | | | | | Cardinality | Data type | Description and Value |
|---|---|---|---|---|---|---|---|---|
| E-AIT | | | | | | | | |
| ServiceDiscovery | | | | | | | | |
| ApplicationDiscovery | | | | | | | | |
| | @DomainName | | | | | 1 | String | defined in TS 102 034[2] |
| | @Version | | | | | 1 | String | defined in TS 102 034[2] |
| | EmergencyApplicationList | | | | | 1 | | defined in TS 102 034[2] |
| | EmergencyApplication | | | | | 1..N | | List of applications which can execute at current program. Application |
| | | appName | | | | 1..N | String | Application name, which can be multilingual |
| | | | @language | | | 1 | | ISO639-2 |
| | | applicationIdentifier | | | | 1 | | Global Unique application ID |
| | | | orgId | | | 1 | unsignedShort | Organization ID which submits the application |
| | | | appid | | | 1 | unsignedInt | Application ID within the scope of the organization |
| | CAPMessage | | | | | 0..N | | CAP Message |
| | EmergencyAlert | | | | | 1..N | | Emergency Alert Information |
| | | SenderName | | | | 0..1 | String | Name of Emergency alert agency |
| | | SentTime | | | | 0..1 | DateTime | Time of origination of the alert |
| | | Category | | | | 0..1 | String | Category of emergency information |
| | | Priority | | | | 0..1 | unsignedShort | Priority |
| | | AlertStatusCode | | | | 0..1 | String | Alert status code(e.g.exercise,actual,system,test,draft) |
| | | Urgency | | | | 0..1 | String | Urgency(e.g. immediate,expected,future,past,unknown) |
| | | Severity | | | | 0..1 | String | Severity of alert(e.g.extreme,severe,moderate,minor) |
| | | area | | | | 0..N | | Target area |
| | | | @type | | | 1 | String | Area code type |
| | | | @value | | | 1 | | |
| | | application.descriptor | | | | 1 | | |
| | | | type | | | 1 | String | "ATSC-HTML" |
| | | | controlCode | | | 1 | String | "AUTOSTART", "PRESENT", "KILL", "TERMINATE", "PREFETCH", "SUSPEND", "DESTROY", "REMOTE", "DISABLED", "PLAYBACK_AUTOSTART" shall not to be used.) |
| | | | serviceBound | | | 1 | Boolean | Indicates whether the application operation scope is within the service or unbound |
| | | | priority | | | 1 | Hexadecimal 8bit | Application priority value to judge which app should be launched |
| | | | icon | | | 0..1 | | |
| | | | | @filename | | 1 | | Application icon location |
| | | | | @size | | 0..N | | Application icon size |
| | | applicationTransport | | | | 1..N | | Application transport method and location |
| | | | URLBase | | | 1 | anyURI | Application URL base(first part) |
| | | | URLExtension | | | 0..N | anyURI | Application URL extensions(second part) |
| | | applicationLocation | | | | 1 | anyURI | Application file URL(third part) |
| | | applicationBoundary | | | | 0..N | | Application operation scope of domain |
| | CAPMessage | | | | | 0..N | | CAP Message |

FIG. 11

```
<MPD availabilityStartTime="2011-12-25T12:30:00">
<Period startTime='0'>
 ...
<EventStream schemeIdUri='urn:atsc:appControlMessage' timescale='1000'>
<Event presentationTime='0' duration='1000'>EMERGENCY ALERT APPLICATION INFORMATION 1</Event>
<Event presentationTime='1000' duration='4000'>EMERGENCY ALERT APPLICATION INFORMATION 2</Event>
 ...
</EventStream>
 ...
<AdaptationSet> - STREAM OF CERTAIN BROADCAST PROGRAM
<Representation/> - Video SEGMENT OF LOW BIT RATE
<Representation/> - Video SEGMENT OF HIGH BIT RATE
</AdaptationSet>
 ...
</Period>
</MPD>
```

F I G . 1 2

| Element/Attribute Name | Use | Description |
|---|---|---|
| EventStream | | specifies event Stream |
| @xlink:href | O | specifies a reference to an external Event Stream element |
| @xlink:actuate | OD default: onRequest | specifies the processing instructions, which can be either "onLoad" or "onRequest". The attribute shall not be present if the @xlink:href attribute is not present. |
| @schemeIdUri | M | identifies the message scheme. The string may use URN or URL syntax. When a URL is used, it is recommended to also contain a month-date in the form mmyyyy; the assignment of the URL must have been authorized by the owner of the domain name in that URL on or very close to that data. A URL may resolve to an internet location, and a location that does resolve may store a specification of the message scheme. |
| @value | O | specifies the value for the event stream element. The value space and semantics must be defined by the owners of the scheme identified in the @schemeId Uri attribute. |
| @timescale | O | specifies the timescale inits per seconds to be used for the derivation of different real-time duration values in the Event elements. If not present on any level, it shall be set to 1. |
| Event | 0..N | specifies one event. For details see Table 25. Events in Event Streams shall be ordered such that their presentation time is non-decreasing. |

F I G . 1 3

| EventStream | | |
|---|---|---|
| @schemeIdUri | urn:atsc3:us:emergency_info | |
| @value | @category, @priority, @urgency, @severity, area | |

FIG. 14

| EventStream | | |
|---|---|---|
| @schemeIdUri | | urn:atsc3:us:emergency_info |
| Event | | |
| | category | |
| | priority | |
| | urgency | |
| | severity | |
| | area | |
| | @type | |

FIG. 15

| EventStream | | |
|---|---|---|
| @schemeIdUri | | urn:atsc3:us:emergency_info |
| Event | | |
| | <![CDATA[ | |
| | <CAP> | CAP Message |
| | .. | |
| | </CAP> | |
| | ]]> | |

FIG. 16

```
In-band message aligned(8) class DASHEventMessageBox extends FullBox('emsg', version=0, flags=0) {
    string           scheme_id_uri;
    string           value;
    unsigned int(32) timescale;
    unsigned int(32) presentation_time_delta;
    unsigned int(32) event_duration;
    unsigned int(32) id;
    unsigned int(8)  message_data[];
}
```

FIG. 17

```
box_type='emsg'
scheme_id_uri = "urn:atsc3:us:emergency_info"
value = 0
timescale = 1000
presentation_time_delta = 0
event_duration = 0xFFFF
id = 1
message_data[] = EMERGENCY ALERT RELATED DATA 1
```

FIG. 18

```
box_type='emsg'
scheme_id_uri = "urn:atsc3:us:emergency_info"
value = 0
timescale = 1000
presentation_time_delta = 0
event_duration = 0xFFFF
id = 2
message_data[] = EMERGENCY ALERT RELATED DATA 2
```

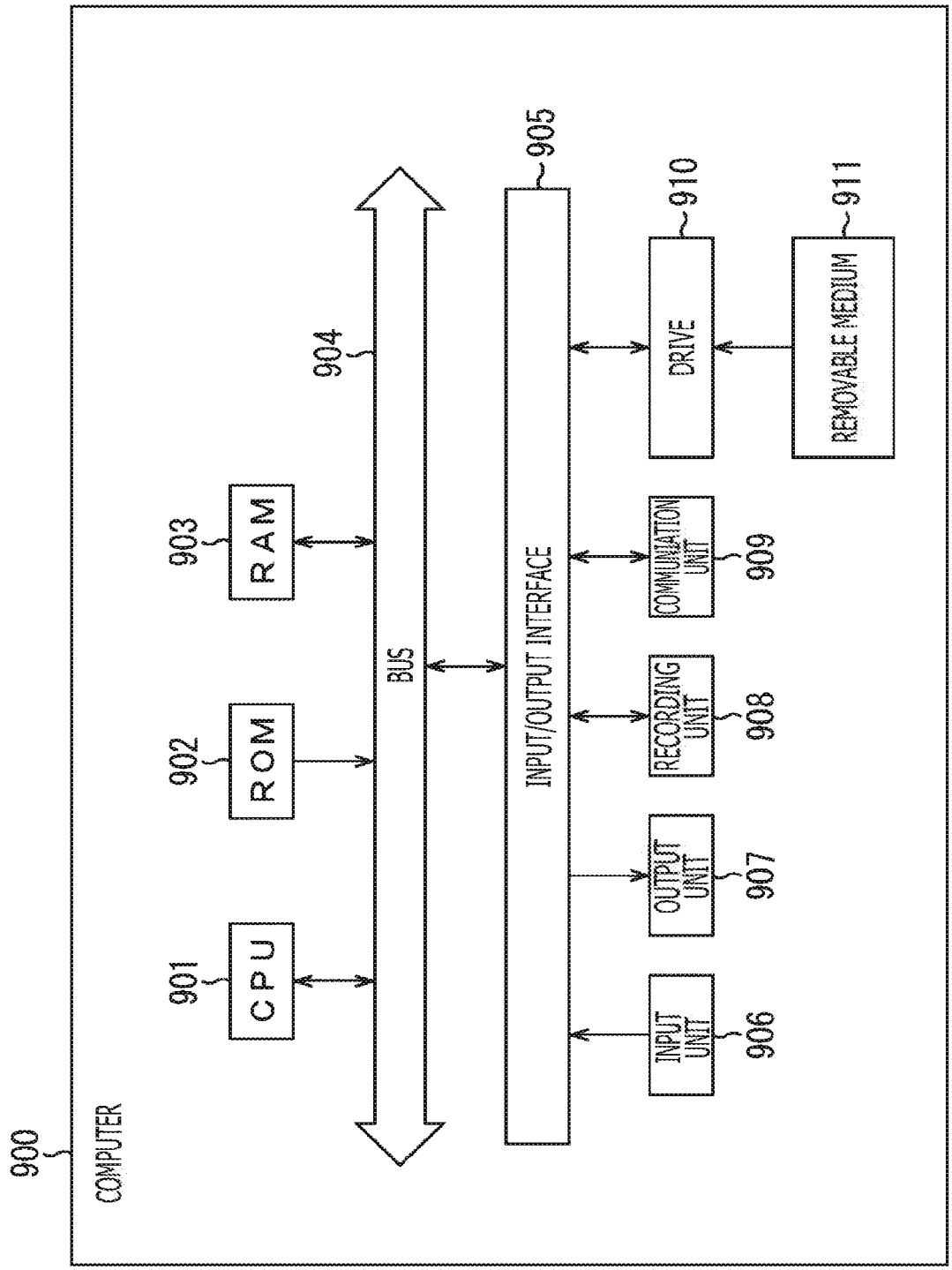

RECEIVING APPARATUS, TRANSMITTING APPARATUS, AND DATA PROCESSING METHOD

TECHNICAL FIELD

The present technology relates to a receiving apparatus, a transmitting apparatus, and a data processing method, and more particularly to a receiving apparatus, a transmitting apparatus, and a data processing method which are capable of providing detailed information of emergency information that is to be announced in case of emergency.

BACKGROUND ART

In the field of digital broadcasting, there have been put forward various proposals for announcing emergency information that is information required to be announced urgently in case of emergency (see, for example, PTL 1).

CITATION LIST

Patent Literature

[PTL 1]
JP 2015-104055A

SUMMARY

Technical Problem

Incidentally, there have been demands for proposals able to provide detailed information such as still images and moving images, apart from simple information such as text or the like, as emergency information to be announced in case of emergency.

The present technology has been accomplished under the circumstances, and offers to be able to provide detailed information of emergency information to be announced in case of emergency.

Solution to Problem

A receiving apparatus according to a first aspect of the present technology is a receiving apparatus including a receiver that receives a digital broadcast signal, and a processor that performs a process with respect to an emergency information application for presenting detailed information of emergency information on the basis of control information that is included in the digital broadcast signal and that includes information about the detailed information of the emergency information which needs to be announced urgently.

The receiving apparatus according to the first aspect of the present technology may be an independent apparatus or an internal block of a single apparatus. A data processing method according to the first aspect of the present technology is a data processing method that is associated with the receiving apparatus according to the first aspect of the present technology described above.

With the receiving apparatus and the data processing method according to the first aspect of the present technology, a digital broadcast signal is received, and a process is performed with respect to an emergency information application for presenting detailed information of emergency information on the basis of control information that is included in the digital broadcast signal and that includes information about the detailed information of the emergency information which needs to be announced urgently.

A transmitting apparatus according to a second aspect of the present technology is a transmitting apparatus including a generator that generates control information including information about detailed information of emergency information which needs to be announced urgently, the control information being used in a process with respect to an emergency information application for presenting the detailed information of the emergency information, and a transmitter that transmits the generated control information as included in a digital broadcast signal.

The transmitting apparatus according to the second of the present technology may be an independent apparatus or an internal block of a single apparatus. A data processing method according to the second aspect of the present technology is a data processing method that is associated with the transmitting apparatus according to the second aspect of the present technology described above.

With the transmitting apparatus and the data processing method according to the second aspect of the present technology, control information including information about detailed information of emergency information which needs to be announced urgently is generated, the control information being used in a process with respect to an emergency information application for presenting the detailed information of the emergency information, and the generated control information is transmitted as included in a digital broadcast signal.

Advantageous Effects of Invention

According to the first aspect and the second aspect of the present technology, there can be provided detailed information of emergency information that is announced in case of emergency.

The advantages described here are not necessarily restrictive, but any of the advantages described in the present disclosure are applicable.

BRIEF DESCRIPTION OF DRAWINGS

FIG. 5 is a diagram depicting an example of activation procedures of an emergency alert application (EAA).

FIG. 9 is a diagram schematically depicting screen transitions upon reception of an emergency alert according to a third procedure B.

FIG. 10 is a diagram depicting an example of syntax of an E-AIT.

FIG. 11 is a diagram depicting a descriptive example of an MPD.

FIG. 12 is a diagram depicting an example of the structure of an EventStream element of an MPD.

FIG. 13 is a diagram depicting a first specific example of an EventStream element.

FIG. 14 is a diagram depicting a second specific example of an EventStream element.

FIG. 15 is a diagram depicting a third specific example of an EventStream element.

FIG. 16 is a diagram depicting an example of the structure of an event message box of a DASH segment.

FIG. 17 is a diagram depicting a first specific example of an event message box.

FIG. 18 is a diagram depicting a second specific example of an event message box.

FIG. 29 is a diagram depicting a configurational example of a computer.

DESCRIPTION OF EMBODIMENT

An embodiment of the present technology will be described below with reference to the drawings. The description will be given in the following order:
1. Operation of a transmission system to which the present technology is applied;
2. The configurations of respective apparatus;
3. The flows of processes carried out by the respective apparatus;
4. Modifications; and
5. The configuration of a computer.

<1. Operation of a Transmission System to which the Present Technology is Applied>

(Configurational Example of a Transmission System)

Figure 1:
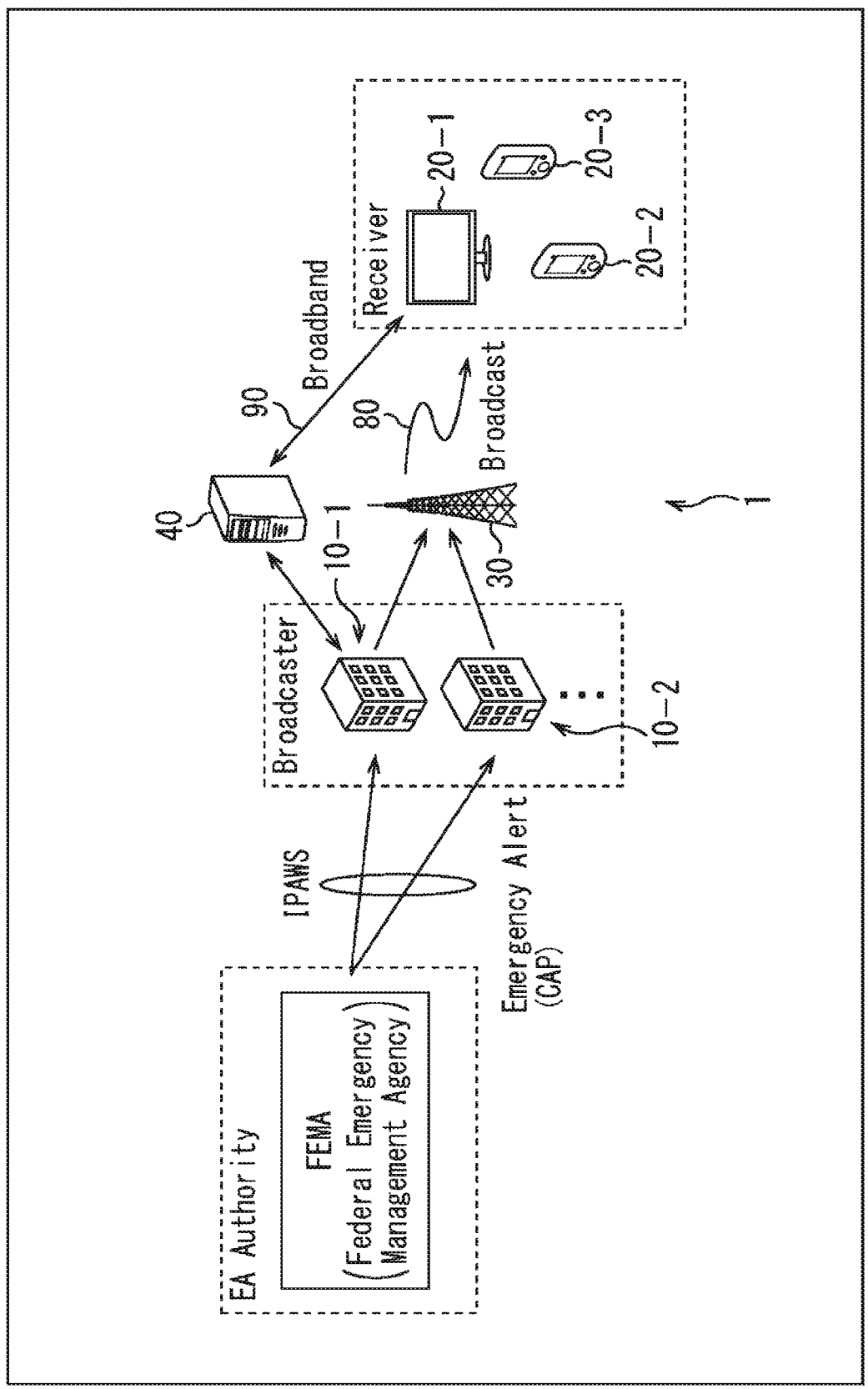
FIG. 1 is a diagram depicting a configuration of an embodiment of a transmission system to which the present technology is applied.

FIG. 1 is a diagram depicting a configuration of an embodiment of a transmission system to which the present technology is applied. The term "system" refers to a logical collection of a plurality of apparatus.

In the transmission system, denoted by 1, each broadcasting station (Broadcaster) includes a transmitting apparatus 10 (e.g., a transmitting apparatus 10-1 or a transmitting apparatus 10-2) installed therein. The transmitting apparatus 10 sends a broadcast stream including contents such as of broadcast programs or the like as a digital broadcast signal.

The digital broadcast signal from the transmitting apparatus 10 is transmitted via a radio tower 30 or the like and a transmission path 80 and received by a receiving apparatus 20. The receiving apparatus 20 is a fixed receiver (e.g., a receiving apparatus 20-1) or a mobile receiver (e.g., a receiving apparatus 20-2 or a receiving apparatus 20-3). The receiving apparatus 20 processes a broadcast stream obtained from the digital broadcast signal, reproducing videos and sounds of contents such as of broadcast programs.

In FIG. 1, the transmission system 1 includes an arrangement corresponding to an emergency announcing system called an EAS (Emergency Alerting System) constructed in the USA. In case of emergency, each broadcasting station provides the receiving apparatus 20 with (notifies the receiving apparatus of) emergency information (emergency alert) that is required to be announced urgently.

In the transmission system 1, specifically, in case of emergency, emergency information source information (e.g., an emergency alert issued at the time of a disaster) announced from an emergency information source such as the FEMA (Federal Emergency Management Agency) or the White House (government) is transformed into CAP information, which is provided to (the transmitting apparatus 10 of) each broadcasting station.

The CAP information is based on the CAP (Common Alerting Protocol) prescribed by the OASIS (Organization for the Advancement of Structured Information Standards). Specifically, in the USA, since an emergency alerting system called EAS has been established, emergency information (CAP information) at various levels from top-priority matter from the President to local notifications is informed (announced) by various media (e.g., via broadcasts or via communications).

Based on the result of an analysis of the CAP information depending on the emergency information source information from the emergency information source, (the transmitting apparatus 10 of) the broadcasting station embeds an emergency alert message (emergency alert) in a video (uncompressed video data) of a broadcast program, for example, and encodes it, thereby generating contents including the emergency alert message. Then, (the transmitting apparatus 10 of) the broadcasting station sends the contents including the emergency alert message to a number of receiving apparatus 20 (e.g., receiving apparatus 20-1 through 20-3) in the broadcasting area.

Each of the receiving apparatus 20 then displays the emergency alert message (emergency alert) in superposed relation to the video of the broadcast program. As a result, the user can confirm the emergency alert message (emergency alert) displayed on the screen of the receiving apparatus 20.

Furthermore, (the transmitting apparatus 10 of) the broadcasting station generates an emergency alert application (EAA) for presenting detailed information of the emergency alert (hereinafter also referred to as emergency detailed information), and sends the emergency alert application (EAA) to a number of receiving apparatus 20 (e.g., receiving apparatus 20-1 through 20-3) in the broadcasting area.

Specifically, an emergency alert as emergency information (emergency alert information) is classified into two types, an emergency alert message (Universal Alert) and an advanced content. The user who is interested in (text information of) an emergency alert message that is displayed earlier can display and confirm (emergency detailed information of) an advanced content.

As an example of emergency alert message (Universal Alert), an emergency alert message displayed in superposed relation to a video of contents when (the transmitting apparatus 10 of) the broadcasting station embeds CAP information depending on emergency information source information in the video (uncompressed video data) of contents of a broadcast program or the like and encodes it will hereinafter be referred to and described as burned-in text. The burned-in text will also be described as "burn-in text."

An advanced content presents emergency detailed information by rich media such as still images and moving images, etc. As an example of advanced content, an application capable of presenting emergency detailed information, which has been developed in HTML5 (HyperText Markup Language 5), will hereinafter be referred to and described as an emergency alert application (EAA). The emergency alert application (EAA) may be generated by Federal Emergency Management Agency (FEMA) or an organization (EA Authority) that issues emergency information source information such as the government, and provided to a distributor of emergency alert information such as (the transmitting apparatus 10 of) the broadcasting station.

An application that has been developed in HTML5 for ordinary broadcasting services will hereinafter be referred to as a broadcast application (BCA), distinguished from an emergency alert application (EAA). However, wherever an emergency alert application (EAA) and a broadcast application (BCA) do not need to be distinguished from each other, they will also be referred to as an HTML5 application (HTML5 app).

AIT (Application Information Table) can be used as information for controlling an HTML5 application. AIT that is used to control an emergency alert application (EAA) is referred to as E-AIT (Emergency-AIT), distinguished from AIT used to control a broadcast application (BCA). E-AIT is an extended version of AIT.

As described in detail later, the life cycle of an emergency alert application (EAA) from its activation to termination is controlled by E-AIT. E-AIT also includes information about (detailed information) of an emergency alert. Furthermore, it is possible to carry out various processes with respect to an emergency alert application (EAA) by using an event message, details of which will be described later.

Referring back to FIG. 1, (the transmitting apparatus 10 of) the broadcasting station can provide an emergency alert application (EAA) to an EA server 40. The EA server 40 distributes the emergency alert application (EAA) provided by (the transmitting apparatus 10 of) the broadcasting station.

In case the receiving apparatus 20 has a communicating function, it can access the EA server 40 via a communication link 90 such as the Internet, a mobile telephone network, or the like and request the emergency alert application (EAA) therefrom. The receiving apparatus 20 then can receive the emergency alert application (EAA) distributed from the EA server 40 via the communication link 90 and execute (activate) the emergency alert application (EAA). The receiving apparatus 20 thus displays emergency detailed information on its screen.

In FIG. 1, if the receiving apparatus 20-1 as a fixed receiver and the receiving apparatus 20-2 and the receiving apparatus 20-3 as mobile receivers are connected to a common home network (home LAN (Local Area Network)), then the receiving apparatus 20-1 may send (transfer) the emergency alert information (e.g., the emergency alert application (EAA) or the like) received from (the transmitting apparatus 10 of) the broadcasting station to the receiving apparatus 20-2 or the receiving apparatus 20-3. The receiving apparatus 20-2 and the receiving apparatus 20-3 as mobile receivers, for example, even if they lack a broadcast-compatible function, are thus capable of receiving and displaying the emergency alert information sent from the receiving apparatus 20-1 as a fixed receiver.

(Outline of Apparatus)

Figure 2:
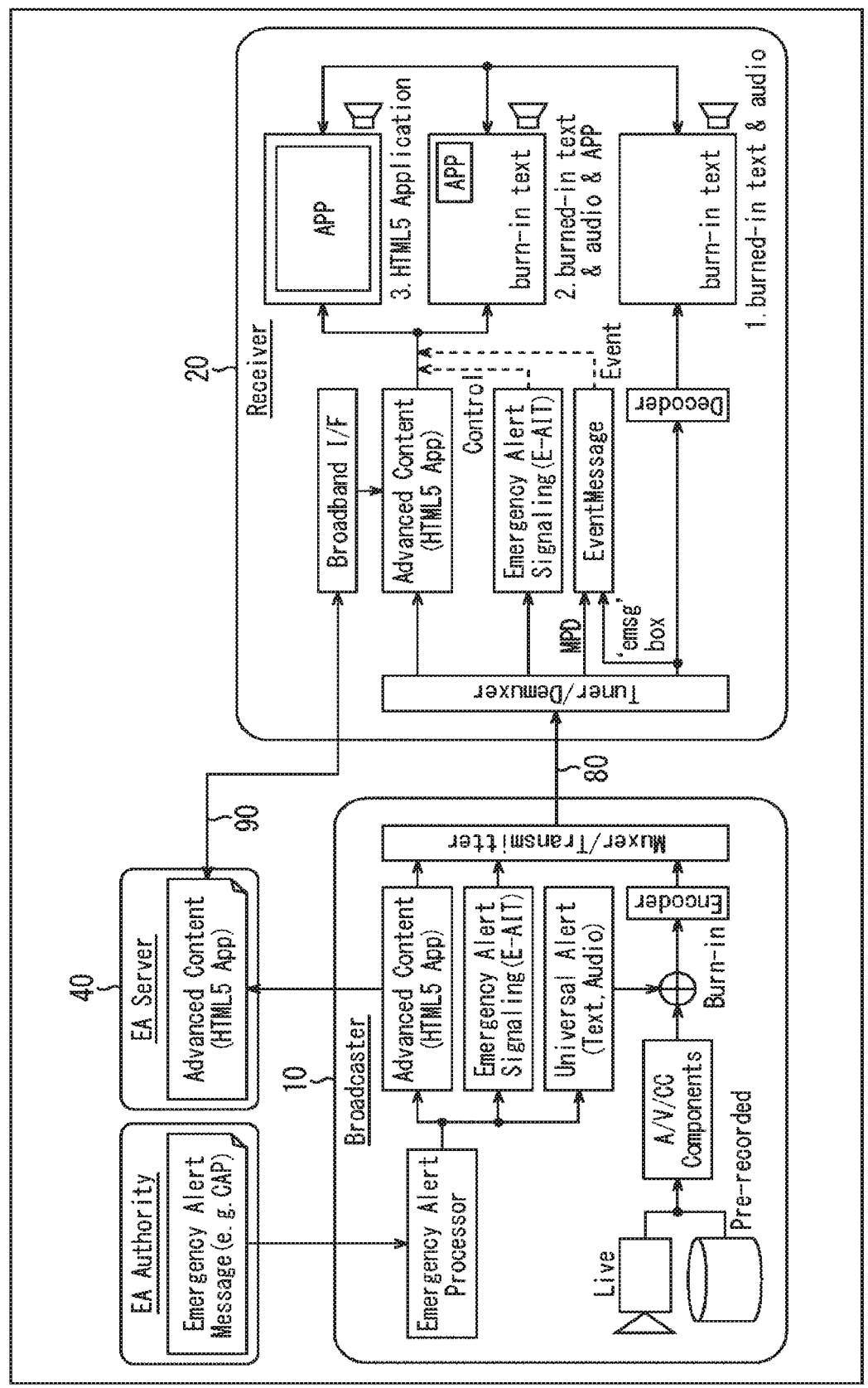
FIG. 2 is a diagram depicting an outline of apparatus of the transmission system depicted in FIG. 1.

FIG. 2 is a diagram depicting an outline of apparatus of the transmission system 1 depicted in FIG. 1.

In FIG. 2, the transmitting apparatus 10 sends a broadcast program such as live contents (e.g., a live broadcast program such as a sports broadcast or the like) sent from a broadcasting place via a transmission path or a communication link, for example, or recorded contents (e.g., a recorded program such as a drama or the like) stored in a storage, as a digital broadcast signal.

In case of emergency, the transmitting apparatus 10 acquires CAP information as emergency information source information announced from an emergency information source (EA authority), embeds an emergency alert message (Universal Alert) depending on the result of an analysis of the CAP information in the video (uncompressed video data) of contents of a broadcast program or the lie, and encodes it. In case of emergency, the transmitting apparatus 10 also distributes sound (Universal Alert) to the visually impaired with a tone signal or an auxiliary sound channel for them.

The transmitting apparatus 10 also generates an E-AIT depending on the result of an analysis of the CAP information. The E-AIT includes information about (detailed information of) an emergency alert, and control information for an emergency alert application (EAA). Moreover, the transmitting apparatus 10 generates an emergency alert application (EAA) which represents advanced contents as LCC contents on the basis of the result of an analysis of the CAP information.

In case of emergency, streams of contents of a broadcast program including an emergency alert message or the like, signaling data including an E-AIT, and LCC contents including an emergency alert application (EAA) are multiplexed and sent as a digital broadcast signal.

In FIG. 2, the apparatus installed in the broadcasting station (Broadcaster) is illustrated as including the transmitting apparatus 10, i.e., a single apparatus, for illustrative purposes. However, the apparatus installed in the broadcasting station may be configured as a transmitting system including a plurality of apparatus.

In FIG. 2, the receiving apparatus 20 receives the digital broadcast signal sent from the transmitting apparatus 10 via the transmission path 80. The receiving apparatus 20 processes a broadcast stream obtained from the digital broadcast signal and reproduces videos and sounds of the contents of the broadcast program or the like.

In case of emergency, since a burned-in text is embedded as an emergency alert message (Universal Alert) in the video (uncompressed video data) of the contents of the broadcast program or the like, the receiving apparatus 20 displays on its screen the burned-in text ("1. burned-in text & audio" in the figure) in superposed relation to the video of the broadcast program. In case of emergency, as sounds (Universal Alert) for the visually impaired are also distributed with a tone signal or an auxiliary sound channel for them, the sounds can also be output.

In case of emergency, since an E-AIT is also transmitted as signaling data, the receiving apparatus 20 analyzes the E-AIT and, based on the result of the analysis, determines whether it is necessary to display emergency detailed information or not, i.e., whether an emergency alert application (EAA) as an advanced content is to be activated or not. If the receiving apparatus 20 decides that an emergency alert application (EAA) is to be activated, then the receiving apparatus 20 acquires an emergency alert application (EAA) transmitted as an LCC contents and activates the acquired emergency alert application (EAA). The receiving apparatus 20 now displays on its screen emergency detailed information according to the emergency alert application (EAA) and the burned-in text in superposed relation to the video of the broadcast program ("2. burned-in text & audio & APP" in the figure). The emergency detailed information according to the emergency alert application (EAA) may be displayed as a full-screen image ("3. HTML5 Application" in the figure).

The transmitting apparatus 10 may provide the emergency alert application (EAA) to the EA server 40. In this case, the receiving apparatus 20 may receive the emergency alert application (EAA) distributed from the EA server 40 via the communication link 90 such as the Internet and activate the received emergency alert application (EAA). As described in detail later, the receiving apparatus 20 may perform a process regarding the emergency alert application (EAA) ("Event" in the figure), using an event message placed in an event stream element ("MPD" in the figure) of an MPD (Media Presentation Description) or an event message box ("'emsg' box" in the figure) of a DASH (Dynamic Adaptive Streaming over HTTP) segment. However, if MMT (MPEG Media Transport) is used as a transport protocol, as described later, then the similar information to an event stream element of an MPD, instead of an event stream element of an MPD, may be embedded in MMT signaling data, or the similar information may be announced as independent signaling data.

The outline of apparatus of the transmission system 1 depicted in FIG. 1 has been described above.

(Transmission Process for Emergency Alert According to an IP Transmission Scheme)

Figure 3:
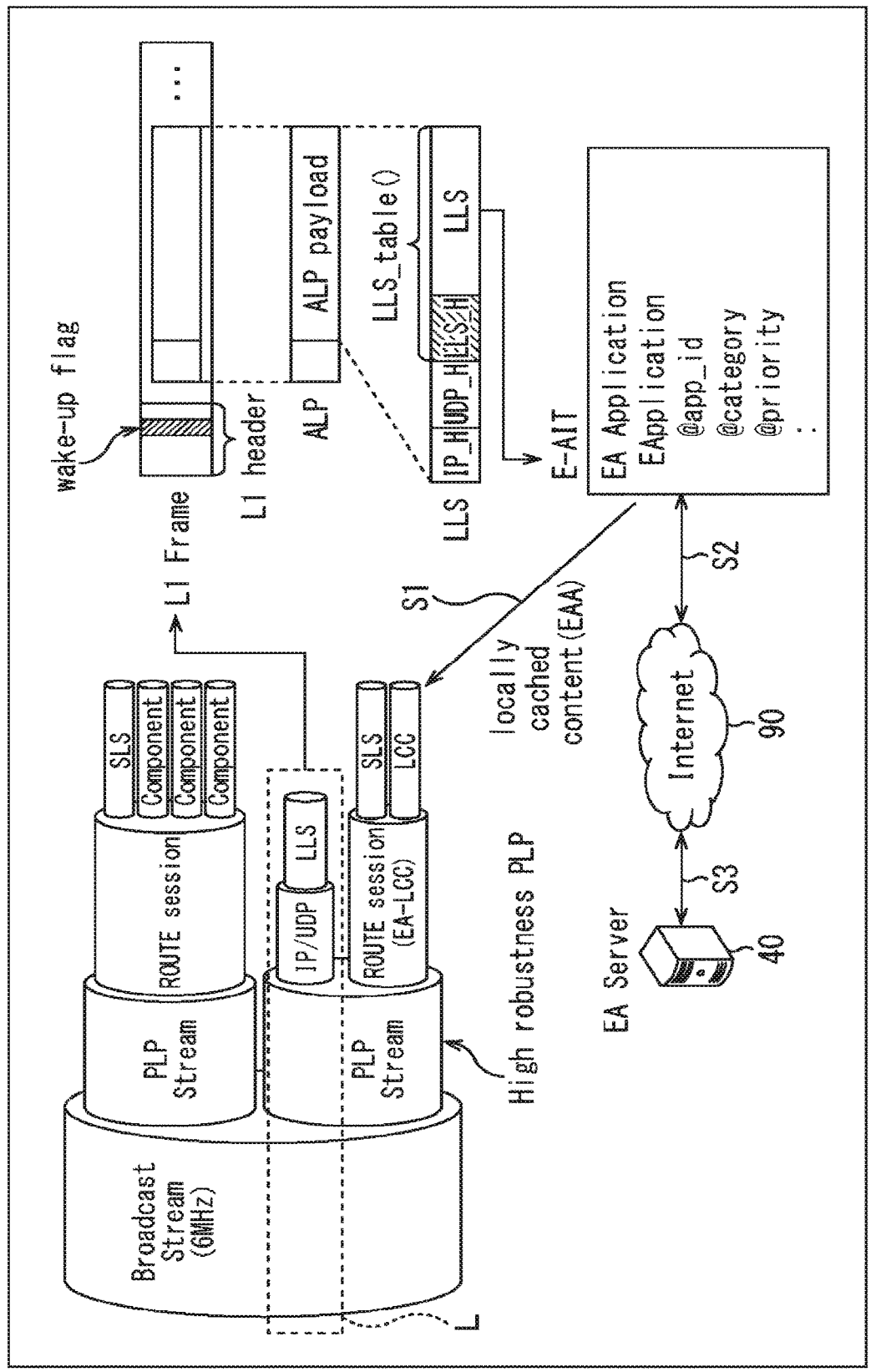
FIG. 3 is a diagram depicting an outline of a transmission scheme for an emergency alert in case digital broadcasting according to an IP transmission scheme is employed.

FIG. 3 is a diagram depicting an outline of a transmission scheme for emergency information in case digital broadcasting according to an IP transmission scheme is employed.

The standards for digital broadcasting in various countries employ an MPEG2-TS (Moving Picture Experts Group phase 2-Transport Stream) scheme as a transmission scheme. In the future, however, it is expected to introduce an IP transmission scheme where IP (Internet Protocol) used in the field of communication are used for digital broadcasting to provide more advanced services.

In particular, the next-generation broadcasting standards of ATSC (Advanced Television Systems Committee) 3.0 in the USA that have currently been worked out have decided on digital broadcasting according to the IP transmission scheme. In the transmission system 1 depicted in FIG. 1, for example, data transmission according to ATSC3.0 can be performed via the transmission path 80 between the transmitting apparatus 10 and the receiving apparatus 20.

In FIG. 3, a pipe representation in a left section thereof depicts a system pipe model of digital broadcasting according to the IP transmission scheme. In the system pipe model, a broadcast stream in a predetermined frequency band (e.g., of 6 MHz) includes one or more PLP streams. Each PLP stream includes streams of signaling data and services.

The broadcast stream in the predetermined frequency band is identified by a broadcast stream ID. Each PLP stream is identified by a PLP ID. Each service is identified by a service ID.

LLS (Link Layer Signaling) signaling data are stored in an IP/UDP packet and transmitted. The LLS signaling data are signaling data acquired prior to SLS (Service Layer Signaling) signaling data. SLS signaling data are acquired according to the information of the LLS signaling data.

The LLS signaling data include meta data such as an SLT (Service List Table), an RRT (Region Rating Table), an E-AIT, etc. The SLT meta data include information representing the makeup of streams and services in a broadcasting network, such as information required to select channels of services (channel selection information). The RRT meta data include information about ratings. The E-AIT meta data (hereinafter referred to as E-AIT) include control information for an emergency alert application (EAA) and information about (detailed information of) an emergency alert.

The meta data of SLT, RRT, E-ATT, etc. are described in a markup language such as XML (Extensible Markup Language) or the like.

The stream of each service is transmission in a ROUTE (Real-Time Object Delivery over Unidirectional Transport) session. ROUTE represents a protocol that is an extended version of FLUTE (File Delivery over Unidirectional Transport) which represents a protocol suitable for unidirectional multicast transfer of files. A stream of SLL signaling data, components, LCC (Locally Cached Contents) contents is transmitted as the stream of each service in a ROUTE session.

The SLS signaling data include meta data such as of USD (User Service Description), S-TSID (Service-based Transport Session Instance Description), MPD (Media Presentation Description), etc. The USD meta data include information about destinations where other meta data are acquired, etc. The S-TSID meta data are an extended version of LSID (LCT Session Instance Description) for ATSC3.0, and represent control information for the ROUTE protocol. The MPD meta data (hereinafter referred to as MPD) represent control information for managing the reproduction of streams of components.

The meta data of USD, S-TSID, MPD, etc. are described in a markup language such as XML or the like. The MPD is based on the standards of MPEG-DASH (Dynamic Adaptive Streaming over HTTP).

A component refers to data that make contents of video data, audio data, subtitles, etc. The LCC contents are contents that are stored (downloaded) in the storage of the receiving apparatus 20 and then processed. In the example depicted in FIG. 3, however, an emergency alert application (EAA) is transmitted as the LCC contents. LCC may occasionally be referred to as NRT (Non Real Time).

Though omitted for the sake of brevity, streams such as NTP (Network Time Protocol) as time information and ESG (Electronic Service Guide) services as an electronic service guide are also transmitted as PLP streams.

In the pipe representation depicted in FIG. 3, the broadcast stream includes two PLP streams having different PLP IDs. One (upper one in the figure) of the PLP streams is an ordinary stream, and the other (lower one in the figure) of the PLP streams is a PLP stream of high robustness.

On the ordinary PLP stream, there are transmitted components of services and SLS signaling data. On the PLP stream of high robustness, there are transmitted streams of LLS signaling data and LCC contents. Therefore, LLS signaling data and LCC contents can be transmitted reliably. In this example, LLS signaling data are used in common by a plurality of services.

Attention is paid to a portion of the figure which is surrounded by the dotted line L, i.e., a stream for transmitting LLS signaling data. In case of emergency, an E-AIT as LLS signaling data is transmitted as follows:

In a protocol stack according to the IP transmission scheme, a layer of the lowest level represents a physical layer (L1: Layer 1), a higher-level layer adjacent to the physical layer represents a layer 2 (L2: Layer 2), a higher-level layer adjacent to the layer 2 represents an IP layer, and a higher-level layer adjacent to the IP layer represents a UDP (User Datagram Protocol) layer.

Specifically, as depicted in a frame (packet) structure representation in a right section of FIG. 3, an L1 frame in the physical layer includes an L1 header and an L1 payload. The L1 header includes a wake-up flag for activating the receiving apparatus 20 on power-off and standby in case of emergency. The L1 payload includes one or more ALP (ATSC Link-layer Protocol) packets placed therein.

The ALP packet is a transmission packet in the layer 2. The ALP payload thereof includes an LLS table placed therein. Since the LLS table is transmitted as being included in an IP/UDP packet, an IP header (IP_H) and a UDP header (UDP_H) are added to an LLS header (LLS_H) thereof. The LLS table includes LLS signaling data, i.e., an E-AIT, in this example.

Figure 4:
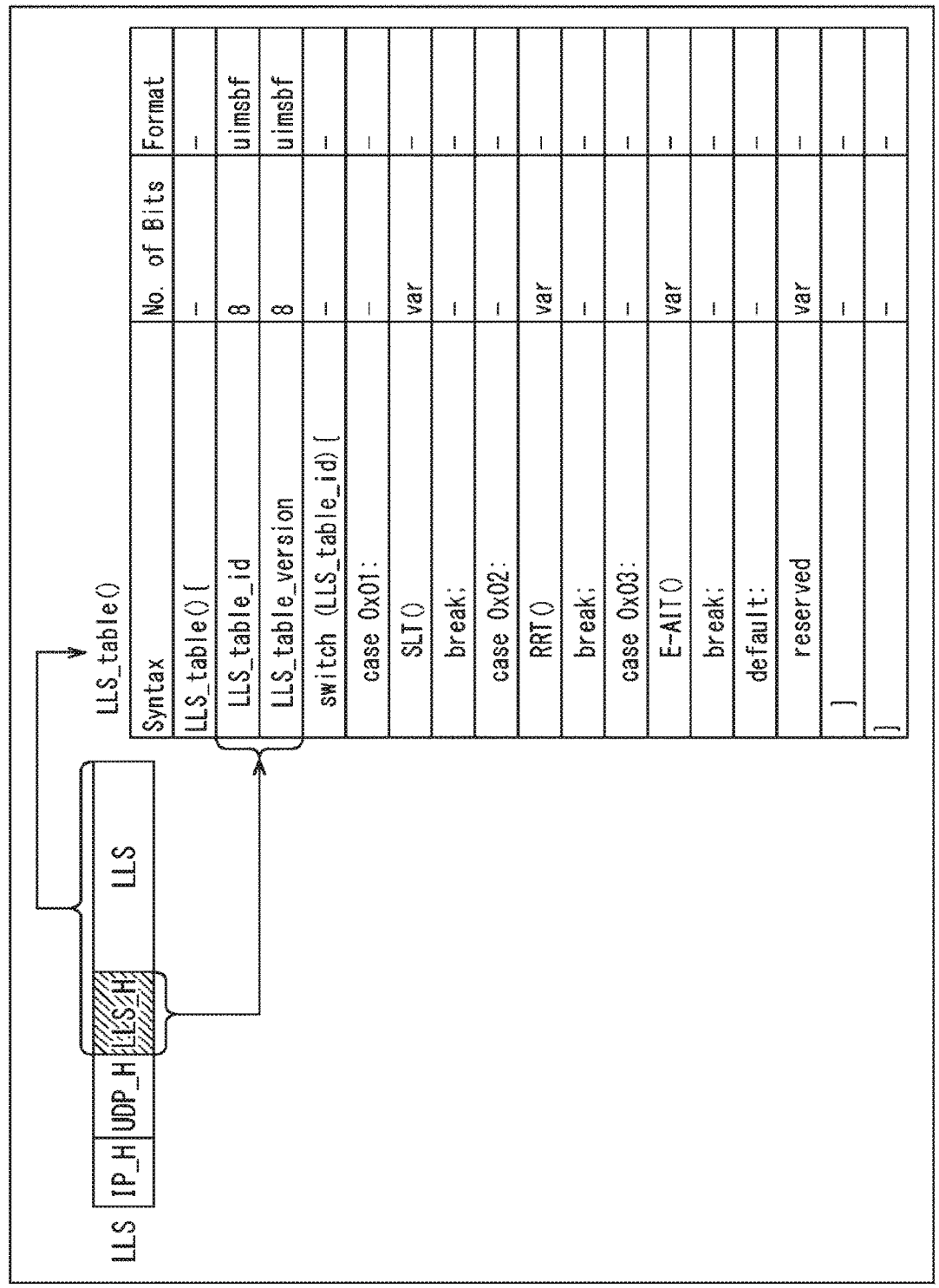
FIG. 4 is a diagram depicting an example of syntax of an LLS table.

FIG. 4 depicts an example of syntax of an LLS table. In the LLS table depicted in FIG. 4, 8-bit LLS_table_id indicates an LLS table ID that identifies the LLS table, and 8-bit LLS_table_version indicates the version of the LLS table. LLS_table_id and LLS_table_version are included in the LLS header.

If "0x01" is indicated as the LLS table ID by a switch statement, then it indicates that SLT meta data are placed as LLS signaling data. If "0x02" is indicated as the LLS table ID, then it indicates that RRT meta data are placed as LLS signaling data, and if "0x03" is indicated as the LLS table ID, then it indicates that an E-AIT is placed as LLS signaling data.

Referring back to FIG. 3, an E-AIT included in the LLS table includes control information for an emergency alert application (EAA) and information about (detailed information of) an emergency alert. When the receiving apparatus 20 receives an E-AIT, the receiving apparatus 20 analyzes the E-AIT and, based on the result of the analysis, determines whether emergency detailed information is to be displayed or not (whether an emergency alert application (EAA) is to be activated or not). For example, the receiving apparatus 20 can determine whether emergency detailed information is to be displayed or not depending on an operation of the user, or whether emergency detailed information is to be displayed or not depending on set information that has been set in advanced by the user.

If the receiving apparatus 20 decides that emergency detailed information is to be displayed, i.e., an emergency alert application (EAA) is to be activated, then the receiving apparatus 20 acquires an emergency alert application (EAA) transmitted as LCC contents in a ROUTE session and activates the acquired emergency alert application (EAA) (S1). As a result, the receiving apparatus 20 displayed on its screen emergency detailed information according to the emergency alert application (EAA).

If an emergency alert application (EAA) is provided by the EA server 40, the E-AIT includes information indicating the URL (Uniform Resource Locator) of the EA server 40. In this case, the receiving apparatus 20 accesses the EA server 40 via the communication link 90 (Internet) based on the E-AIT, and requests the emergency alert application (EAA) from the EA server 40 (S2, S3). The receiving apparatus 20 then receives the emergency alert application (EAA) distributed from the EA server 40 via the communication link 90 and activates the received emergency alert application (EAA) (S3, S2). As a result, the receiving apparatus 20 displayed on its screen emergency detailed information according to the emergency alert application (EAA).

In case of emergency, therefore, not only simple information is presented in terms of an emergency alert message (Universal Alert) represented by a character string such as a burned-in text or the like, but also emergency detailed information including still images, moving images, etc., for example, can be presented to the user who is interested in the information according to the emergency alert application (EAA) as advanced contents.

In the example depicted in FIG. 3, ROUTE is used as a transmission protocol (transport protocol) in a transport layer. However, other transport protocols may be used. For example, according to ATSC3.0 that has currently been worked out, ROUTE and MMT (MPEG Media Transport) are expected to exist together as transport protocols. Streams of components and signaling data may be transmitted in an MMT session, other than a ROUTE session.

As described above, if ROUTE or MMT is used as a transport protocol in digital broadcasting according to an IP transmission scheme such as ATSC3.0 or the like, then emergency information (emergency alert) depending on emergency information source information (e.g., an emergency alert issued at the time of a disaster) from an emergency information source such as the FEMA (Federal Emergency Management Agency) can be provided (announced) to the receiving apparatus 20 in case of emergency.

(Activating Scheme for an Emergency Alert Application (EAA))

A comparison between a broadcast application (BCA) and an emergency alert application (EAA) indicates that the emergency alert application (EAA) that is activated in case of emergency has a higher priority of activation than the broadcast application (BCA) that is activated in ordinary hours. Therefore, if the broadcast application (BCA) is being activated when the emergency alert application (EAA) is to be activated, then it is necessary to display emergency detailed information according to the emergency alert application (EAA) with priority.

One solution to priority activation would be that the receiving apparatus 20 activates the emergency alert application (EAA), letting the emergency alert application (EAA) determine whether it is necessary to display emergency detailed information or not. However, if the broadcast application (BCA) is being activated, then the broadcast application (BCA) has to be temporarily suspended or terminated, and then the emergency alert application (EAA) is activated to determine whether it is necessary to display emergency detailed information or not.

In case it is necessary to display emergency detailed information, the emergency detailed information may be displayed by the emergency alert application (EAA) that is being activated. However, in case it is not necessary to display emergency detailed information, the emergency alert application (EAA) that is being activated has to be terminated and then the execution of the broadcast application (BCA) has to be resumed or the broadcast application (BCA) has to be activated again. In other words, even though the emergency alert application (EAA) can be activated in the receiving apparatus 20, the user, for example, may find only the emergency alert message (burned-in text) enough, and may not need the emergency detailed information in question. In such a case, there is no need to activate the emergency alert application (EAA).

According to the present technology, the E-AIT, which is an extended version of the AIT, includes information about (detailed information of) an emergency alert in addition to control information for an emergency alert application (EAA). The receiving apparatus 20 determines whether it is necessary to display emergency detailed information or not depending on the result of an analysis of the E-AIT, and only if emergency detailed information is to be displayed the emergency alert application (EAA) is activated. According to the present technology, alternatively, CAP information is included in the E-AIT, so that the emergency alert application (EAA) can directly receive and process the CAP information. Furthermore, if the broadcast application (BCA) is being activated when the emergency alert application (EAA) is to be activated, then the receiving apparatus 20 temporarily suspends or terminates the broadcast application (BCA) and preferentially activates the emergency alert application (EAA).

With respect to a process of determining whether the emergency alert application (EAA) is to be activated for displaying emergency detailed information or not, the receiving apparatus 20 may determine whether it is necessary to display emergency detailed information or not depending on an operation of the user, or whether it is necessary to display emergency detailed information or not depending on the result of the analysis of the E-AIT, as described above.

In the latter case, for example, the receiving apparatus 20 determines whether its viewing region is an emergency alert target region or not. If the viewing region is not an emergency alert target region, then the receiving apparatus 20 does not activate the emergency alert application (EAA) and does not display emergency detailed information. Moreover, for example, the receiving apparatus 20 may determine whether to activate the emergency alert application (EAA) or not on the basis of set information registered by the user (such that, e.g., information about the weather is to be displayed, but information about an emergency school closure is not to be displayed).

FIG. 5 is a diagram depicting an example of activation procedures of an emergency alert application (EAA).

As depicted in FIG. 5, an emergency alert application (EAA) for presenting detailed information of an emergency alert (emergency detailed information) can be activated by either of first through third procedures to display emergency detailed information. These first through third procedures are examples of a sequence for activating an emergency alert application (EAA), and an emergency alert application (EAA) may be activated by other procedures.

According to the first procedure, an emergency alert application (EAA) is activated by a resident application (RA).

Specifically, in case an E-AIT (autostart) is received by the receiving apparatus 20 while a broadcast program is being viewed thereon by the user, a resident application (RA) displays an icon (EA icon) indicating that detailed information of an emergency alert (emergency detailed information) is received, according to the E-AIT (autostart). Having confirmed the displayed information (selection information), the user determines whether to display emergency detailed information or not. If the user indicates the display of emergency detailed information, then an emergency alert application (EAA) is activated (executed), and emergency detailed information is displayed on the screen of the receiving apparatus 20.

Thereafter, in case an E-AIT (terminate) is received by the receiving apparatus 20, the resident application (RA) terminates the emergency alert application (EAA) that is being activated according to the E-AIT (terminate). Now, the display of the emergency detailed information disappears and only the broadcast program is displayed on the screen of the receiving apparatus 20.

According to the second procedure, an emergency alert application (EAA) is activated while a broadcast application (BCA) is not being executed.

Specifically, in case an E-AIT (autostart) is received by the receiving apparatus 20 while a broadcast program is being viewed thereon by the user, middleware (MW) or a browser (BR) or the like activates (executes) an emergency alert application (EAA) to display detailed information of an emergency alert (emergency detailed information) according to the E-AIT (autostart).

Thereafter, in case an E-AIT (terminate) is received by the receiving apparatus 20, the middleware (MW) or the browser (BR) or the like terminates the emergency alert application (EAA) that is being activated according to the E-AIT (terminate). Now, the display of the emergency detailed information disappears and only the broadcast program is displayed on the receiving apparatus 20.

According to the third procedure, an emergency alert application (EAA) is activated while a broadcast application (BCA) is being executed.

Specifically, in case an E-AIT (autostart) is received by the receiving apparatus 20 while a broadcast program is being viewed thereon by the user and a broadcast application (BCA) is activated, middleware (MW) or a browser (BR) or the like activates (executes) an emergency alert application (EAA) to display detailed information of an emergency alert (emergency detailed information) according to the E-AIT (autostart). At this time, the broadcast application (BCA) that is being activated is temporarily suspended (terminated), and its video disappears from the screen of the receiving apparatus 20.

Thereafter, in case an E-AIT (terminate) is received by the receiving apparatus 20, the middleware (MW) or the browser (BR) or the like terminates the emergency alert application (EAA) that is being activated according to the E-AIT (terminate). Now, the display of the emergency detailed information disappears and the broadcast program is displayed on the receiving apparatus 20. The execution of the broadcast application (BCA) that is being temporarily suspended is resumed, and its video is displayed in superposed relation to the broadcast program.

Moreover, using an event message, it is possible to carry out various processes with respect to an emergency alert application (EAA), such as a process of updating an emergency alert application (EAA). A third procedure which uses an event message will hereinafter be referred to as a third procedure B, distinguished from a third procedure A which is a third procedure which does not use an event message.

Details of the first through third procedures will be described below.

(1) First Procedure

Figure 6:
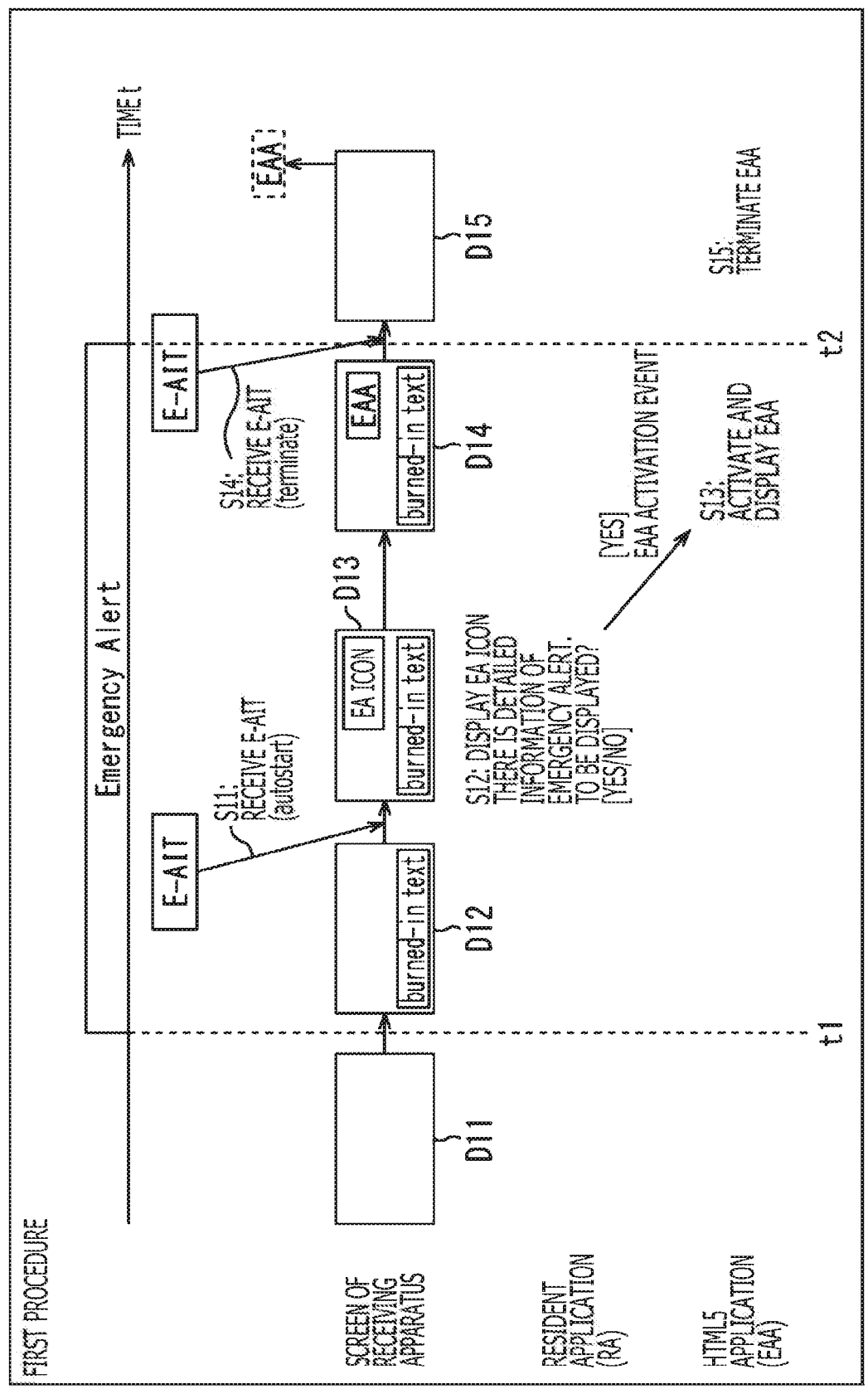
FIG. 6 is a diagram schematically depicting screen transitions upon reception of an emergency alert according to a first procedure.

FIG. 6 is a diagram schematically depicting screen transitions upon reception of an emergency alert according to the first procedure. In the example depicted in FIG. 6, screens D11 through D15 represent screen transitions of the receiving apparatus 20, and steps S11 through S15 represent operation of the receiving apparatus 20. In FIG. 6, the direction of time goes from the left to the right. In the example depicted in FIG. 6 an emergency alert (Emergency Alert) is announced between time t1 and time t2. A resident application (RA) is an application that is incorporated in the receiving apparatus 20.

In a time zone prior to time t1 at which an emergency alert is announced, the receiving apparatus 20 displays only the video of a broadcast program on its screen, which are viewed by the user (D11). At this point of time, an HTML5 application such as a broadcast application (BCA) or the like is not executed.

At time t1, the receiving apparatus 20 receives an emergency alert announced from the transmitting apparatus 10 via the transmission path 80. The receiving apparatus 20 displays a character string of burned-in text in superposed relation to the video of the broadcast program (D12). The content of the burned-in text as an emergency alert message (Universal Alert) is now confirmed by the user.

The receiving apparatus 20 also receives an E-AIT (autostart) announced from the transmitting apparatus 10 via the transmission path 80 (S11). In the receiving apparatus 20, the resident application (RA) analyzes the E-AIT (autostart), and displays an EA icon depending on the result of the analysis on its screen (S12, D13). The EA icon displays a message such as "there is detailed information of an emergency alert, to be displayed?," for example, and a "YES" button and a "NO" button for selecting the display of the emergency detailed information.

It is also possible here to display various pieces of information based on information included in the E-AIT, such as the level of emergency, target region, category, etc. about the emergency alert. Moreover, the resident application (RA) may determine whether it is necessary to display the emergency detailed information or not, depending on set information (e.g., settings such as a display target region, a display target item, etc.).

If the "YES" button displayed as the EA icon on the screen (D13) is selected by the user, the receiving apparatus 20 issues an EAA activation event of an emergency alert application (EAA), activating the emergency alert application (EAA) (S13). As a result, the receiving apparatus 20 displays on its screen emergency detailed information by the emergency alert application (EAA), together with a burned-in text, in superposed relation to the video of the broadcast program (D14).

In case of emergency, therefore, not only simple information is presented in terms of an emergency alert message (Universal Alert) represented by a character string such as a burned-in text or the like, but also emergency detailed information including still images, moving images, etc., for example, can be presented to the user who is interested in the information according to the emergency alert application (EAA) as advanced contents, thereby presenting more detailed information.

Thereafter, past time t2, the announcement of the emergency alert from the transmitting apparatus 10 is finished. The receiving apparatus 20 receives an E-AIT (terminate) from the transmitting apparatus 10 via the transmission path 80 (S14). The receiving apparatus 20 analyzes the E-AIT (terminate) and terminates the emergency alert application (EAA) being activated depending on the result of the analysis (S15). As a result, the display of the burned-in text and the emergency detailed information ("EAA" in the figure) disappears from the screen of the receiving apparatus 20, and only the video of the broadcast program is displayed thereon (D15).

According to the first procedure, as described above, the resident application (RA) displays the EA icon based on the E-AIT (autostart). If the user indicates the display of emergency detailed information, the emergency alert application (EAA) is activated, displaying emergency detailed information. If there is no need to display emergency detailed information, for example, the emergency alert application (EAA) is not activated, and only if it is necessary to display emergency detailed information, the emergency alert application (EAA) is activated. Accordingly, the processing burden on the receiving apparatus 20 is reduced as the emergency alert application (EAA) is prevented from being activated uselessly. Moreover, the resident application (RA) can control the life cycle (operation from activation to termination) of the emergency alert application (EAA) on the basis of the E-AIT.

(2) Second Procedure

Figure 7:
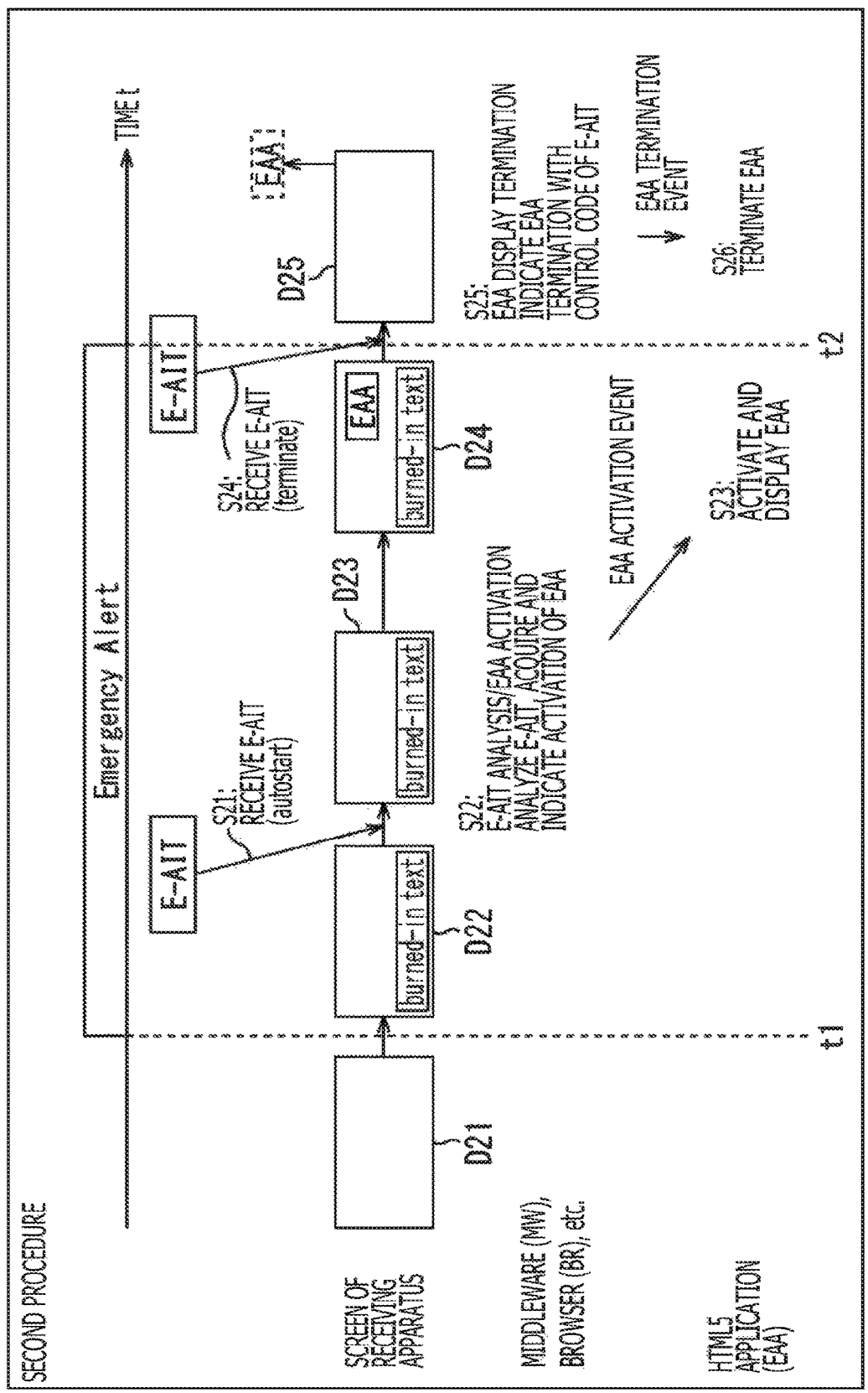
FIG. 7 is a diagram schematically depicting screen transitions upon reception of an emergency alert according to a second procedure.

FIG. 7 is a diagram schematically depicting screen transitions upon reception of an emergency alert according to the second procedure. In the example depicted in FIG. 7, screens D21 through D25 represent screen transitions of the receiving apparatus 20, and steps S21 through S26 represent operation of the receiving apparatus 20. In FIG. 7, the direction of time also goes from the left to the right. In the example depicted in FIG. 7, an emergency alert is announced between time t1 and time t2. Middleware (MW) corresponds to an MW unit 213 (FIG. 19) to be described later. A browser (BR) corresponds to a browser 214 (FIG. 19) to be described later. In this example, middleware (MW) and a browser (BR) will be described as main processing agents. However, other software and hardware may perform processing sequences. These relationships also apply to FIGS. 8 and 9.

In a time zone prior to time t1 at which an emergency alert is announced, the receiving apparatus 20 displays videos of a broadcast program on its screen, which are viewed by the user (D21). At this point of time, an HTML5 application such as a broadcast application (BCA) or the like is not executed.

At time t1, the receiving apparatus 20 receives an emergency alert announced from the transmitting apparatus 10 via the transmission path 80. The receiving apparatus 20 displays a character string of burned-in text in superposed relation to the video of the broadcast program (D22). The content of the burned-in text as an emergency alert message (Universal Alert) is now confirmed by the user.

The receiving apparatus 20 also receives an E-AIT (autostart) announced from the transmitting apparatus 10 via the transmission path 80 (S21). In the receiving apparatus 20, the middleware (MW) or the browser (BR) analyzes the E-AIT (autostart), and instructs the receiving apparatus 20 to acquire and activate an emergency alert application (EAA) depending on the result of the analysis on its screen (S22).

It is possible here for the middleware (MW) or the browser (BR) to determine whether it is necessary to display emergency detailed information or not depending on an instruction from the user or set information (e.g., settings such as a display target region, a display target item, etc.). For example, the middleware (MW) or the browser (BR) can display an icon indicating that emergency detailed information is received on an activation screen of an emergency alert application (EAA), for example, and can display emergency detailed information only when the user judges that emergency detailed information is to be displayed and indicates the display of emergency detailed information.

The receiving apparatus 20 then acquires and activates an emergency alert application (EAA) in accordance with an instruction (EAA activation event) from the middleware (MW) or the browser (BR) (S23). As a result, the receiving apparatus 20 displays on its screen emergency detailed information by the emergency alert application (EAA), together with a burned-in text, in superposed relation to the video of the broadcast program (D24).

In case of emergency, therefore, not only simple information is presented as an emergency alert message (Universal Alert) represented by a character string such as a burned-in text or the like, but also emergency detailed information including still images, moving images, etc., for example, can be presented to the user who is interested in the information according to the emergency alert application (EAA) as advanced contents, thereby presenting more detailed information.

Thereafter, past time t2, the announcement of the emergency alert from the transmitting apparatus 10 is finished. The receiving apparatus 20 receives an E-AIT (terminate) from the transmitting apparatus 10 via the transmission path 80 (S24). In the receiving apparatus 20, the middleware (MW) or the browser (BR) analyzes the E-AIT (terminate) and instructs the receiving apparatus 20 to terminate the emergency alert application (EAA) being activated depending on the result of the analysis (S25).

The receiving apparatus 20 terminates the emergency alert application (EAA) being activated in accordance with an instruction (EAA termination event) from the middleware (MW) or the browser (BR) (S26). As a result, the display of the burned-in text and the emergency detailed information ("EAA" in the figure) disappears from the screen of the receiving apparatus 20, and only the video of the broadcast program is displayed thereon (D25).

According to the second procedure, as described above, the emergency alert application (EAA) is activated only if the middleware (MW) or the browser (BR) decides that the emergency alert application (EAA) is to be displayed on the basis of the E-AIT. Accordingly, the processing burden on the receiving apparatus 20 is reduced as the emergency alert application (EAA) is prevented from being activated uselessly. Moreover, the middleware (MW) or the browser (BR) can control the life cycle (operation from activation to termination) of the emergency alert application (EAA) on the basis of the E-AIT.

(3) Third Procedure A

Figure 8:
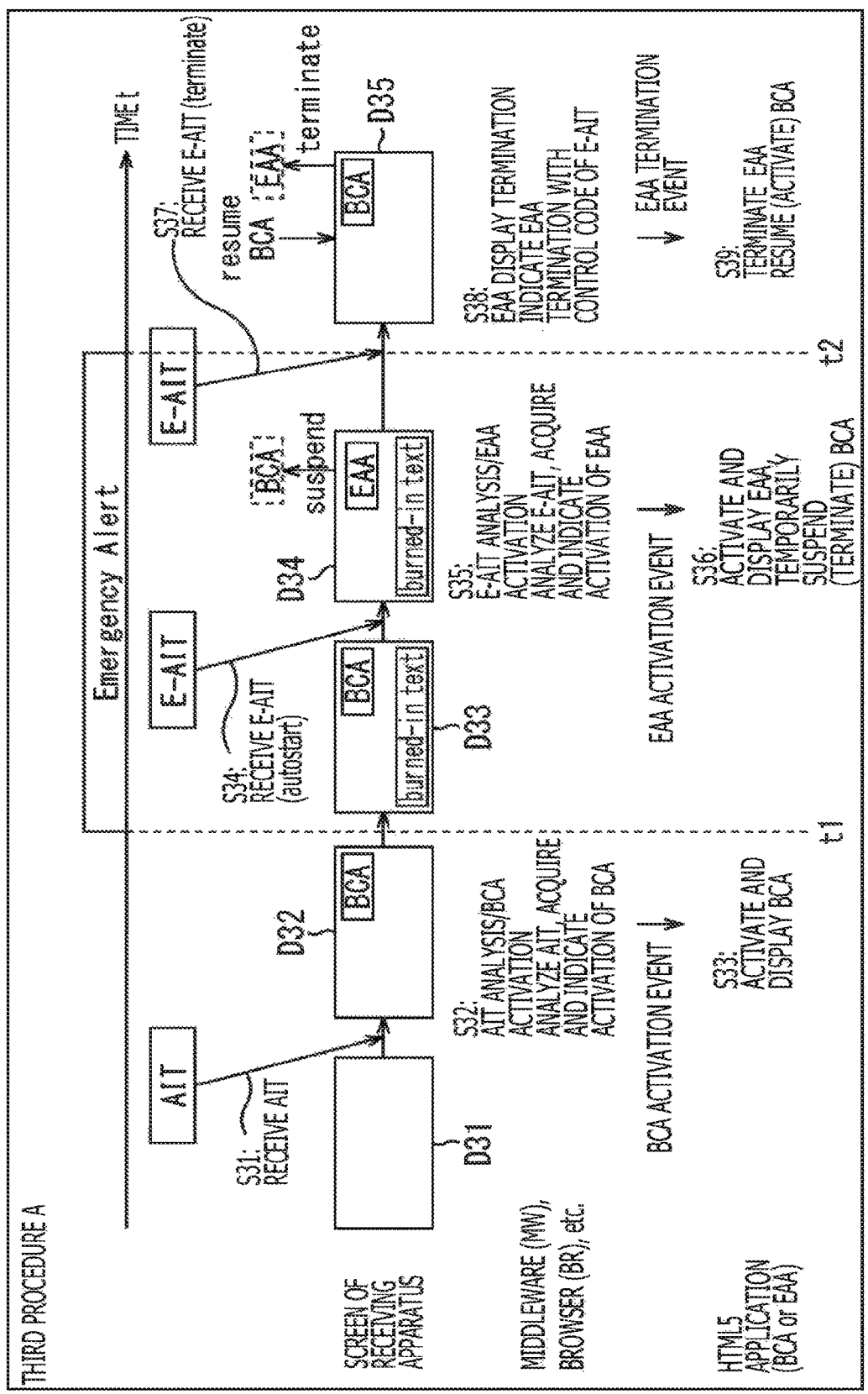
FIG. 8 is a diagram schematically depicting screen transitions upon reception of an emergency alert according to a third procedure A.

FIG. 8 is a diagram schematically depicting screen transitions upon reception of an emergency alert according to the third procedure A. In the example depicted in FIG. 8, screens D31 through D35 represent screen transitions of the receiving apparatus 20, and steps S31 through S39 represent operation of the receiving apparatus 20. In FIG. 8, the direction of time also goes from the left to the right. In the example depicted in FIG. 8, an emergency alert is announced between time t1 and time t2.

In a time zone prior to time t1 at which an emergency alert is announced, the receiving apparatus 20 displays the video of a broadcast program on its screen, which are viewed by the user (D31). The receiving apparatus 20 also receives an AIT announced from the transmitting apparatus 10 via the transmission path 80 (S31). In the receiving apparatus 20, the middleware (MW) or the browser (BR) analyzes the AIT, and instructs the receiving apparatus 20 to acquire and activate a broadcast application (BCR) depending on the result of the analysis (S32).

The receiving apparatus 20 then acquires and activates a broadcast application (BCR) in accordance with an instruction (EAA activation event) from the middleware (MW) or the browser (BR) (S33). As a result, the receiving apparatus 20 displays on its screen information (e.g., an image, a video, characters, etc.) by the broadcast application (BCA) in superposed relation to the video of the broadcast program (D32).

At time t1, the receiving apparatus 20 receives an emergency alert announced from the transmitting apparatus 10 via the transmission path 80. The receiving apparatus 20 displays a character string of burned-in text along with the information of the broadcast application (BCA) in superposed relation to the video of the broadcast program (D33). The content of the burned-in text as an emergency alert message (Universal Alert) is now confirmed by the user.

The receiving apparatus 20 also receives an E-AIT (autostart) announced from the transmitting apparatus 10 via the transmission path 80 (S34). In the receiving apparatus 20, the middleware (MW) or the browser (BR) analyzes the E-AIT (autostart), and instructs the receiving apparatus 20 to acquire and activate an emergency alert application (EAA) depending on the result of the analysis on its screen (S35).

It is possible here for the middleware (MW) or the browser (BR) to determine whether it is necessary to display emergency detailed information or not depending on an instruction from the user or set information (e.g., settings such as a display target region, a display target item, etc.). For example, the middleware (MW) or the browser (BR) can display an icon indicating that emergency detailed information is received on an activation screen of an emergency alert application (EAA), for example, and can display emergency detailed information only when the user judges that emergency detailed information is to be displayed and indicates the display of emergency detailed information.

The receiving apparatus 20 then acquires and activates an emergency alert application (EAA) in accordance with an instruction (EAA activation event) from the middleware (MW) or the browser (BR) (S36). At this time, the broadcast application (BCA) that is being activated is temporarily suspended or terminated. As a result, the receiving apparatus 20 displays on its screen emergency detailed information by the emergency alert application (EAA), instead of information by the broadcast application (BCA) (D34). On the screen of the receiving apparatus 20, the burned-in text is being continuously displayed in superposed relation to the video of the broadcast program (D34).

In case of emergency, therefore, not only simple information is presented as an emergency alert message (Universal Alert) represented by a character string such as a burned-in text or the like, but also emergency detailed information including still images, moving images, etc., for example, can be presented to the user who is interested in the information according to the emergency alert application (EAA) as advanced contents, thereby presenting more detailed information.

Thereafter, past time t2, the announcement of the emergency alert from the transmitting apparatus 10 is finished. The receiving apparatus 20 receives an E-AIT (terminate) announced from the transmitting apparatus 10 via the transmission path 80 (S37). In the receiving apparatus 20, the middleware (MW) or the browser (BR) analyzes the E-AIT (terminate) and instructs the receiving apparatus 20 to terminate the emergency alert application (EAA) that is being activated depending on the result of the analysis (S38).

The receiving apparatus 20 terminates the emergency alert application (EAA) that is being activated in accordance with an instruction (EAA termination event) from the middleware (MW) or the browser (BR) (S39). If the broadcast application (BCA) has been temporarily suspended when the emergency alert application (EAA) is activated, then the execution of the broadcast application (BCA) is resumed (the broadcast application (BCA) is activated). As a result, the display of the burned-in text and the emergency detailed information ("EAA" in the figure) disappears from the screen of the receiving apparatus 20, and information by the broadcast application (BCA) is displayed in superposed relation to the video of the broadcast program (D35). In other words, the display on the screen of the receiving apparatus 20 returns to the state before the emergency alert is announced (D32).

If the broadcast application (BCA) has been terminated when the emergency alert application (EAA) is activated, then the execution of the broadcast application (BCA) is not resumed, and only the video of the broadcast program is displayed on the screen of the receiving apparatus 20.

According to the third procedure A, as described above, the emergency alert application (EAA) is activated only if the middleware (MW) or the browser (BR) decides that the emergency alert application (EAA) is to be displayed on the basis of the E-AIT. Accordingly, the processing burden on the receiving apparatus 20 is reduced as the emergency alert application (EAA) is prevented from being activated uselessly. Moreover, according to the third procedure A, if the broadcast application (BCA) is being activated when the emergency alert application (EAA) is to be activated, then the broadcast application (BCA) is temporarily suspended or terminated and then the emergency alert application (EAA) is activated. Therefore, the emergency alert application (EAA) is preferentially activated. Emergency detailed information can thus reliably be presented to the user.

(4) Third Procedure B: Handling an Event

FIG. 9 is a diagram schematically depicting screen transitions for handling an event upon reception of an emergency alert according to the third procedure B. In the example depicted in FIG. 9, screens D41 through D45 represent screen transitions of the receiving apparatus 20, and steps S41 through S49 represent operation of the receiving apparatus 20. In FIG. 9, the direction of time also goes from the left to the right. In the example depicted in FIG. 9, an emergency alert is announced between time t1 and time t2.

In a time zone prior to time t1 at which an emergency alert is announced, the receiving apparatus 20 displays information by a broadcast application (BCA) in superposed relation to the video of a broadcast program on its screen (D41). The process of activating the broadcast application is similar to the third procedure A (S31 through S33 in FIG. 8) described above, and will not be described here.

At time t1, the receiving apparatus 20 receives an emergency alert announced from the transmitting apparatus 10 via the transmission path 80. As a result, the receiving apparatus 20 displays on its screen a character string of burned-in text, together with the information by the broadcast application (BCA), in superposed relation to the video of the broadcast program (D42). The content of the burned-in text as an emergency alert message (Universal Alert) is now confirmed by the user.

The receiving apparatus 20 also receives an E-AIT (autostart) announced from the transmitting apparatus 10 via the transmission path 80 (S41). In the receiving apparatus 20, the middleware (MW) or the browser (BR) analyzes the E-AIT (autostart), and instructs the receiving apparatus 20 to acquire and activate an emergency alert application (EAA1) depending on the result of the analysis on its screen (S42).

It is possible here, as with the above third procedure A, to determine whether it is necessary to display emergency detailed information or not depending on an instruction from the user or set information (e.g., settings such as a display target region, a display target item, etc.). For example, an icon indicating that emergency detailed information is received can be displayed on an activation screen of an emergency alert application (EAA), for example, and emergency detailed information can be displayed only when the user judges that emergency detailed information is to be displayed and indicates the display of emergency detailed information.

The receiving apparatus 20 then acquires and activates an emergency alert application (EAA1) in accordance with an instruction (EAA1 activation event) from the middleware (MW) or the browser (BR) (S43). At this time, the broadcast application (BCA) that is being activated is temporarily suspended or terminated. As a result, the receiving apparatus 20 displays on its screen emergency detailed information by the emergency alert application (EAA1), instead of information by the broadcast application (BCA) (D43). On the screen of the receiving apparatus 20, the burned-in text is being continuously displayed in superposed relation to the video of the broadcast program (D43).

In case of emergency, therefore, not only simple information is presented as an emergency alert message (Universal Alert) represented by a character string such as a burned-in text or the like, but also emergency detailed information including still images, moving images, etc., for example, can be presented to the user who is interested in the information according to the emergency alert application (EAA) as advanced contents, thereby presenting more detailed information.

Subsequently, the receiving apparatus 20 receives an event message announced from the transmitting apparatus 10 via the transmission path 80 (S44). In the receiving apparatus 20, the middleware (MW) or the browser (BR) analyzes the event message, and instructs the receiving apparatus 20 to perform a transition from the emergency alert application (EAA1) to an emergency alert application (EAA2) depending on the result of the analysis (S45). In other words, the middleware (MW) or the browser (BR) announces the event message to the emergency alert application (EAA1). Based on information described in the event message (event information), the emergency alert application (EAA1) carries out a process of performing a transition to the emergency alert application (EAA2) if the event information represents an instruction for a transition to the emergency alert application (EAA2).

The receiving apparatus 20 then acquires and activates an emergency alert application (EAA2) in accordance with an instruction (EAA2 transition event) from the middleware (MW) or the browser (BR) (S46). As a result, the receiving apparatus 20 updates (the page of) emergency detailed information by the emergency alert application (EAA1), and displays on its screen (the page of) the emergency detailed information by the emergency alert application (EAA2). Here, the emergency alert application (EAA2) means updating (page transition) of the whole of a page displayed by the emergency alert application (EAA1), and also updating of part of a page displayed by the emergency alert application (EAA1).

Thus, emergency detailed information ("EAA2" in the figure) that is different from the emergency detailed information ("EAA1" in the figure) presented first can be presented to the user who is interested in an emergency alert message, thereby presenting more detailed information.

Thereafter, past time t2, the announcement of the emergency alert from the transmitting apparatus 10 is finished. The receiving apparatus 20 receives an E-AIT (terminate) announced from the transmitting apparatus 10 via the transmission path 80 (S47). In the receiving apparatus 20, the middleware (MW) or the browser (BR) analyzes the E-AIT (terminate) and instructs the receiving apparatus 20 to terminate the emergency alert application (EAA (EAA2)) that is being activated depending on the result of the analysis (S48).

The receiving apparatus 20 terminates the emergency alert application (EAA (EAA2)) that being activated in accordance with an instruction (EAA (EAA2) termination event) from the middleware (MW) or the browser (BR) (S49). If the broadcast application (BCA) has been temporarily suspended when the emergency alert application (EAA1) is activated, then the execution of the broadcast application (BCA) is resumed (the broadcast application (BCA) is activated). As a result, the display of the burned-in text and the emergency detailed information ("EAA2" in the figure) disappears from the screen of the receiving apparatus 20, and information by the broadcast application (BCA) is displayed in superposed relation to the video of the broadcast program (D45). In other words, the display on the screen of the receiving apparatus 20 returns to the state before the emergency alert is announced (D41).

According to the third procedure B, as described above, the emergency alert application (EAA) is activated only if the middleware (MW) or the browser (BR) decides that the emergency alert application (EAA) is to be displayed on the basis of the E-AIT. Accordingly, the processing burden on the receiving apparatus 20 is reduced as the emergency alert application (EAA) is prevented from being activated uselessly. Moreover, according to the third procedure B, the middleware (MW) or the browser (BR) can control processes with respect to the emergency alert application (EAA) (e.g., the control of the life cycle thereof, a transition of the emergency alert application (EAA) due to updating of an emergency alert as time goes by, etc.) on the basis of the event message.

The first through third procedures have been described as processes of activating the emergency alert application (EAA). However, these procedures are employed for illustrative purposes only, and other activation procedures than the first through third procedures may be employed.
(Syntax of an E-AIT)

FIG. 10 is a diagram depicting an example of syntax of an E-AIT. In FIG. 10, of elements and attributes, attributes are accompanied by "@." Those elements and attributes which are indented are designated for elements at levels higher than them.

An E-AIT includes a ServiceDiscovery element and an ApplicationDiscovery element. The Application Discovery element includes, as root elements (attributes), a DomainName attribute, a Version attribute, an EmergencyApplicationList element, an EmergencyApplication element, and a CAPMessage element.

A domain name is designated for the DomainName attribute. A version is designated for the Version attribute. A list of emergency alert applications (EAAs) that can be executed under a current program is designated for the EmergencyApplicationList element.

Information about an emergency alert applications (EAA) is designated for the EmergencyApplication element. The EmergencyApplication element serves as an element at a higher level than an appName element, an applicationIdentifier element, a CAPMessage element, an emergencyAlert element, an applicationDescriptor element, an applicationTransport element, an applicationLocation element, and an applicationBoundary element.

The name of an emergency alert application (EAA) is designated for the appName element. The appName element serves as an element at a higher level than a language attribute. A language code prescribed by ISO 639-2 is designated for the language attribute.

The applicationIdentifer element serves as an element at a higher level than an orgId element and an appId element. An organization ID is designated for the orgId element. An application ID is designated for the appId element. In other words, a global and unique application ID is designated by a combination of an organization ID and an application ID.

CAP information can be placed in the CAPMessage element. Specifically, in case CAP information is to be related to an emergency alert application (EAA), CAP information is placed in the CAPMessage element of this EmergencyApplication element.

Information (basic information) about (detailed information of) an emergency alert is designated for the emergencyAlert element. The emergencyAlert element serves as an element at a higher level than a senderName attribute, a sentTime attribute, a category attribute, a priority attribute, an alertStatusCode attribute, an urgency attribute, a severity attribute, and an area element.

Information indicating an issuing source of an emergency alert such as Federal Emergency Management Agency (FEMA), a broadcasting station, or the like is designated for the senderName attribute. Information indicating the time at which an emergency alert is issued is designated for the sentTime attribute.

The category of an emergency alert is designated for the category attribute. Information for classifying an emergency alert, such as "Geo(Geophysical)," "Met(Meteorological)," or "Safety," etc., for example, is designated as a category depending on the manner in which the emergency alert is applied.

Information indicating the degree of priority of an emergency alert is designated for the priority attribute. Numerical values such as 0, 1, 2, 3, . . . , for example, are designated as the information indicating the degree of priority. The degree of priority is lowest for the numerical value 0, and is progressively higher for larger numerical values. A degree of priority is assigned depending on the manner in which the emergency alert is applied.

A code indicating the status of an emergency alert, e.g., indicating if an emergency alert is designed for a test or is a real one, is designated for the alertStatusCode attribute. For example, "exercise," "actual," "system," "test," "draft," etc. are designated as such a code.

Information indicating the degree of urgency of an emergency alert is designated for the urgency attribute. For example, "immediate," "expected," "future," "past," etc. are designated as the information indicating the degree of urgency. "immediate" means that an immediate evacuation process is sought. "expected" means that an evacuation process to be started soon (within one hour, for example) is sought. "future" means that an evacuation process to be started soon (there is more time to spare than "expected") is sought. "past" means that there is no need to evacuate.

Information indicating the severity of an emergency alert is designated for the severity attribute. Information for classifying the severity of an emergency alert, such as "extreme," "severe," "moderate," "minor," etc., for example, is designated depending on the manner in which the emergency alert is applied.

Information (code) indicating an emergency alert target region is designated for the area element. The area element serves as an element at a higher level than a type attribute.

A type of information (code) indicating a target region is designated for the type attribute. For example, "zip" or "latitude/longitude" is designated for the type.

"zip" indicates that a target region is designated by a five-digit or nine-digit postal code (ZIP code) used by the United States Postal Service (USPS), for example. "latitude/longitude" indicates that a target region is designated by a latitude and a longitude.

Incidentally, the information (basic information) about an emergency alert that is designated for the emergencyAlert element is used in the determining process (the process of determining whether it is necessary to display emergency detailed information or not) upon activation of an emergency alert application (EAA). Since determining conditions therefor are different depending on the manner in which the emergency alert is applied, the basic information is not limited to the above information, but information depending on the content of the determining process may be designated. Of the elements or attributes beneath the emergencyAlert element, the alertStatusCode attribute is an indispensable attribute, but it is optional if other elements and attributes are to be designated or not.

Information about an emergency alert application (EAA) is designated for the application Descriptor element. The applicationDescriptor element serves as an element at a higher level than a type element, a controlCode element, a serviceBound element, a priority element, and an icon element.

The type element serves as an element at a higher level than an AtscApp element. A type of an emergency alert application (EAA) is designated for the AtscApp element. "ATSC-HTML" indicating an application developed in HTML5, for example, is designated as the type.

A control code (command) with respect to an emergency alert application (EAA) is designated for the controlCode element. Either of "AUTOSTART," "PRESENT," "KILL," "TERMINATE," "PREFETCH," and "SUSPEND," for example, is designated as the control code.

"AUTOSTART" is a command for automatically executing an emergency alert application (EAA) immediately. "PRESENT" is a command for not automatically executing an emergency alert application (EAA). "KILL" and "TERMINATE" are commands for terminating an emergency alert application (EAA). According to the present embodiment, "TERMINATE" is used as a command for terminating an emergency alert application (EAA). However, "KILL" may be designated instead of "TERMINATE."

"PREFETCH" is a command for acquiring an emergency alert application (EAA) via a broadcast or communication. "SUSPEND" is a command for temporarily suspending an emergency alert application (EAA). Incidentally, "DESTROY," "REMOTE," "DISABLED," and "PLAYBACK_AUTOSTART" are not be used as control codes.

A range of services, etc. with which an emergency alert application (EAA) operates in conjunction is designated for the serviceBound element. The degree of priority in the type of the same application is designated for the priority element.

Information about an icon of an emergency alert application (EAA) is designated for the icon element. The icon element serves as an element at a higher level than a filename attribute and a size attribute. Information about the file name of the icon is designated for the filename attribute. Information about the size of the icon is designated for the size attribute.

A transfer process and location information of an emergency alert application (EAA) is designated for the applicationTransport element. The applicationTransport element serves as an element at a higher level than URLBase element and an URLExtension element. The URL of a base part is designated for the URLBase element. The URL of an extended part is designated for the URLExtension element. The URL of the file of an emergency alert application (EAA) is designated for the applicationLocation element. Specifically, location information (URL) of an emergency alert application (EAA) is designated by a combination of the URL of the base part (first part), the URL of the extended part (second part), and the URL of the file part (third part).

Information indicating an operating range (boundary information) of an emergency alert application (EAA) is designated for the applicationBoundary element. A particular domain is designated for the boundary information. The emergency alert application (EAA) is allowed to operate within the range of the domain. Location information (URL) of the emergency alert application (EAA) may be used instead of the domain.

CAP information may be placed in the CAPMessage element (of the root element). If the same CAP information is related to all of (a plurality of) emergency alert applications (EAAs) (if the CAP information is transmitted by the entire E-AIT), the CAP information is placed in the CAPMessage element of this root element.

With respect to the number of occurrences (Cardinality) in FIG. 10, if "1" is designated, then one element or one attribute therefor is necessarily designated, and if "0 . . . 1" is designated, then it is optional if an element or an attribute therefor is to be designated or not. If "1 . . . N" is designated, then one or more elements or attributes therefor are designated, and "0 . . . N" is designated, then it is optional if one or more elements or attributes therefor are to be designated or not.

If "string" is designated as Data Type, then it indicates that the value of an element or attribute therefor is of a character string type. If "unsignedShort" or "unsignedInt" is designated as Data Type, then it indicates that the value of an element or attribute therefor is of an integer type. If "Boolean" is designated as Data Type, then it indicates that an element or attribute therefor is of a Boolean type, and if "Hexadecimal" is designated as Data Type, then it indicates that an element or attribute therefor is hexadecimal. If "anyURI" is designated as Data Type, then it indicates that the value of an element or attribute therefor is of an anyURI data type.

The syntax of an E-AIT depicted in FIG. 10 is by way of example, and other syntaxes may be employed by adding other elements and attributes, for example. An E-AIT is not limited to the XML format, but may be described by other markup languages or may be of a section format.

(Process of Transmitting an Event Message)

As described above, the receiving apparatus 20 can perform a process with respect to an emergency alert application (EAA) based on an event message. An event message may be placed in an event stream element of an MPD or an event message box of a DASH segment transmitted in a ROUTE session, for example. Now, a case in which an event message is placed in an event stream element of an MPD and a case in which an event message is placed in an event message box of a DASH segment will be described below in the order named. Incidentally, if MMT is used instead of ROUTE as a transport protocol, then an element similar to an event stream element of an MPD may be transmitted as part of MMT signaling data or independent signaling data.

Alternatively, an event message may be embedded in a media segment of MMT, rather than a DASH segment, and transmitted.

(1) A Case in which an Event Message is Placed in an Event Stream Element of an MPD.

(Descriptive Example of an MPD)

FIG. 11 is a diagram depicting a descriptive example of an MPD.

As depicted in FIG. 11, an MPD has a Period element, an AdaptationSet element, and a Representation element that are described in a hierarchical structure. The Period element serves as a unit for describing the makeup of contents such as of a broadcast program or the like. The AdaptationSet element and the Representation element are used for each of streams of components of video data, audio data, subtitles, etc., and are capable of describing attributes of the respective streams.

Specifically, AdaptationSet elements represent streams encoded from various kinds of sources. In order to allow the receiving apparatus 20 to select a stream depending on parametrics such as bit rates or the like, for example, Representation elements are placed in AdaptationSet elements, listing streams that serve as a plurality of options having different parameters such as bit rates or the like. Normally, an AdaptationSet element and a Representation element correspond to a single stream such as a video stream, an audio stream, or a subtitle stream.

Furthermore, if AdaptationSet elements represent streams where a plurality of streams such as a video stream, an audio stream, and a subtitle stream are multiplexed, then Representation elements are placed in the AdaptationSet elements, listing the multiplexed streams that serve as a plurality of options having different parameters such as bit rates or the like. In other words, a plurality of AdaptationSet elements representing multiplexed streams are placed in each Period element that represents a time interval, and a plurality of Representation elements placed in those AdaptationSet elements list a plurality of multiplexed streams having different bit rates, for example.

Moreover, in an MPD, an EventStream element can be described in a Period element. An event message can be placed in the EventStream element.

In an EventStream element, a schemeIdUri attribute and a timescale element can be described as its attributes. A URI for identifying the scheme of an event message is designated for the schemeIdUri attribute. In this descriptive example, "urn:atsc:appControlMessage" is designated as the attribute value of the schemeIdUri attribute, and this attribute value identifies the event message as an event message with respect to an emergency alert (emergency alert application (EAA)). A timescale '100C' is designated as the attribute value of the timescale attribute.

The EventStream element serves as an element at a higher level than an Event element. An event message can be described in the Event element between start and end tags thereof. A presentationTime attribute for which a presentation time (start time) is designated and a duration attribute for which a period from the start time is designated can be designated for the Event element as its attributes.

In this descriptive example, two Event elements are described between the start and end tags of the EventStream element, for example. The upper Event element indicates that contents described in "emergency alert application information 1" during the period '1000' from the start time '0' are issued as an event message. In addition, the lower Event element indicates that contents described in "emergency alert application information 2" during the period '4000' from the start time '1000' are issued as an event message.

The "emergency alert application information 1" and the "emergency alert application information 2" include information (basic information) about an emergency alert that is designated for the emergencyAlert element of E-AIT (FIG. 10) and control information for an emergency alert application (FAA). Therefore, the receiving apparatus 20 is able to perform a process with respect to an emergency alert application (EAA), such as a process of updating an emergency alert application (EAA), for example, based on the event message.

The EventStream element of an MPD has a structure as depicted in FIG. 12, and can transmit an event message with a combination of other elements and attributes than those of the descriptive example of an MPD depicted in FIG. 11.

(Structure of an EventStream Element of an MPD)

FIG. 12 is a diagram depicting an example of the structure of an EventStream element of an MPD.

As depicted in FIG. 12, the EventStream element serves as an element at a higher level than an xlink:href attribute, an xlink:actuate attribute, a schemeIdUri attribute, a value attribute, a timescale attribute, and an Event element.

An URI of an external event stream element is designated for the xlink:href attribute. A timing of traversal is designated for the xlink:actuate attribute. An XLink (XML Linking Language) represents specifications that define a link between XML documents.

An URI for identifying the scheme of an event message is designated for the schemeIdUri attribute. A value of the EventStream element is designated as an attribute value for the value attribute. Information indicating a timescale is designated for the timescale attribute. Information about an event is designated for the Event element.

(Specific Example of an EventStream Element)

Specific examples of structures of the EventStream element, which has the structure depicted in FIG. 12, by which an event message about (detailed information of) an emergency alert is announced are illustrated in FIGS. 13 through 15.

(First Specific Example)

FIG. 13 is a diagram depicting a first specific example of an EventStream element.

In FIG. 13, "urn:atsc3:us:emergency_info" is designated as the schemeIdUri attribute of the EventStream element. In other words, the attribute value of the schemeIdUri attribute identifies the event message as an event message with respect to an emergency alert (emergency alert application (EAA)).

At least one information of the attribute value of the category attribute of the emergencyAlert element, the attribute value of the priority attribute, the attribute value of the urgency attribute, the attribute value of the severity attribute, and the values of the area element and its type attribute of the E-AIT (FIG. 10), for example, is designated, comma delimited, as the attribute value of the value attribute of the EventStream element.

Since this event message is included as signaling data in an MPD that is transmitted for each service, the receiving apparatus 20 is able to perform a process with respect to an emergency alert application (EAA), at a predetermined timing, based on the event message included in an MPD.

Elements and attributes that are designated for the value attribute of the EventStream element correspond to the information (basic information) about an emergency alert that is designated for the emergencyAlert element of E-AIT (FIG. 10). The information designated for the value attribute depicted in FIG. 13 is not restrictive, but information depending on various ways in which the emergency alert is applied can be designated. Control information for an emergency alert application (EAA), for example, rather than the basic information, may be designated.

(Second Specific Example)

FIG. 14 is a diagram depicting a second specific example of an EventStream element.

In FIG. 14, "urn:atsc3:us:emergency_info" is designated as the schemeIdUri attribute of the EventStream element. In other words, the attribute value of the schemeIdUri attribute identifies the event message as an event message with respect to an emergency alert (emergency alert application (EAA)).

The Event element of the EventStream element serves as an element at a higher level than a category element, a priority element, an urgency element, a severity element, and an area element. The area element serves as an element at a higher level than a type attribute. These elements and attributes correspond to elements and attributes of the emergencyAlert element of the E-AIT (FIG. 10).

Since this event message is included as signaling data in an MPD that is transmitted for each service, the receiving apparatus 20 is able to perform a process with respect to an emergency alert application (EAA), at a predetermined timing, based on the event message included in an MPD.

Elements and attributes that are designated under the Event element of the EventStream element correspond to the information (basic information) about an emergency alert that is designated for the emergencyAlert element of E-AIT (FIG. 10). The information designated for the elements and attributes designated under the Event element depicted in FIG. 14 is not restrictive, but information depending on various ways in which the emergency alert is applied can be designated. Control information for an emergency alert application (EAA), for example, rather than the basic information, may be designated.

(Third Specific Example)

FIG. 15 is a diagram depicting a third specific example of an EventStream element.

In FIG. 15, "urn:atsc3:us:emergency_info" is designated as the schemeIdUri attribute of the EventStream element. In other words, the attribute value of the schemeIdUri attribute identifies the event message as an event message with respect to an emergency alert (emergency alert application (EAA)).

In the Event element of the EventStream element, CAP information is placed in a CDATA section prescribed by XML. The CAP information is information depending on emergency information source information from an emergency information source.

Since this event message (CPA information) is included as signaling data in an MPD that is transmitted for each service, the receiving apparatus 20 is able to perform a process with respect to an emergency alert application (EAA), at a predetermined timing, based on the event message (CPA information) included in an MPD.

The information placed in the CDATA section in the Event element of the EventStream element is not limited to CAP information, but information depending on various ways in which the emergency alert is applied can be placed.

(2) A Case in which an Event Message is Placed in an Event Message Box of a DASH Segment.

(Structure of an Event Message Box)

FIG. 16 is a diagram depicting an example of the structure of an event message box ('emsg box') of a DASH segment transmitted in a ROUTE session.

An event message box of a DASH segment stores scheme_id_uri, value, timescale, presentation_time_delta, event_duration, id, and message_data[ ] therein.

An URI for identifying the scheme of an event message is designated for the scheme_id_uri which is of the character string type. Various values are designated for the value which is of the character string type.

Information indicating a timescale is designated for the timescale which is of the 32-bit unsigned integer type. Information indicating a presentation time (start time) is designated for the presentation_time_delta which is of the 32-bit unsigned integer type. Information indicating the period of an event message is designated for the event_duration which is of the 32-bit unsigned integer type.

Information for identifying an event message is designated for the id which is of the 32-bit unsigned integer type. Data of an event message are placed in the message_data[ ] which is of the 8-bit unsigned integer type.

(Specific Examples of a DASH Message Box)

Specific examples of a situation where an event message about (detailed information of) an emergency alert is announced by an event message box that has the structure depicted in FIG. 16 are illustrated in FIGS. 17 and 18.

(First Specific Example)

FIG. 17 is a diagram depicting a first specific example of the structure of an event message box of a DASH segment.

In FIG. 17, 'emsg' meaning an event message box is designated as box_type, and "urn:atsc3:us:emergency_info" is designated for scheme_id_uri. In other words, this scheme_id_uri identifies the event message as an event message with respect to an emergency alert (emergency alert application (EAA)). 0 is designated for value.

1000 is designated as a time scale for timescale. 0 is designated as a presentation time (start time) for presentation_time_delta. Furthermore, 0xFFFF is designated as the period of an event message for event_duration.

1 is designated as an event message ID for id. Emergency alert related data 1 is placed as the data of an event message in message_data[ ]. Information (basic information) about an emergency alert designated by the emergencyAlert element of the E-AIT (FIG. 10) may be placed as the emergency alert related data 1. Furthermore, not only the basic information, but also control information for an emergency alert application (EAA), for example, may be designated. Moreover, CAP information or the like may be placed here.

In the example depicted in FIG. 17, the data (basic information of an E-AIT) of an event message are placed in message_data[ ]. However, the data (basic information of an E-AIT) of an event message may be placed, comma delimited, in value.

(Second Specific Example)

FIG. 18 is a diagram depicting a second specific example of the structure of an event message box of a DASH segment.

In FIG. 18, 'emsg' meaning an event message box is designated as box_type, and "urn:atsc3:us:emergency_info" is designated for scheme_id_uri. In other words, this scheme_id_uri identifies the event message as an event message with respect to an emergency alert (emergency alert application (EAA)). 0 is designated for value.

1000 is designated as a time scale for timescale. 0 is designated as a presentation time (start time) for presentation_time_delta. Furthermore, 0xFFFF is designated as the period of an event message for event_duration.

2 is designated as an event message ID for id. Emergency alert related data 2 is placed as the data of an event message in message_data[ ]. Information (basic information) about an emergency alert designated by the emergencyAlert element of the E-AIT (FIG. 10) may be placed as the emergency alert related data 2. Furthermore, not only the basic information, but also control information for an emergency alert application (EAA), for example, may be designated. Moreover, CAP information or the like may be placed here.

In the example depicted in FIG. 18, the data (basic information of an E-AIT) of an event message are placed in message_data[ ]. However, the data (basic information of an E-AIT) of an event message may be placed, comma delimited, in value.

<2. The Configurations of Respective Apparatus>

Next, the detailed configurations of respective apparatus that make up the transmission system 1 depicted in FIG. 1 will be described below. Here, the configuration of a transmitting apparatus 10 installed by a broadcasting station and the configuration of a receiving apparatus 20 installed by a user will mainly be described hereinbelow.

Figure 19:
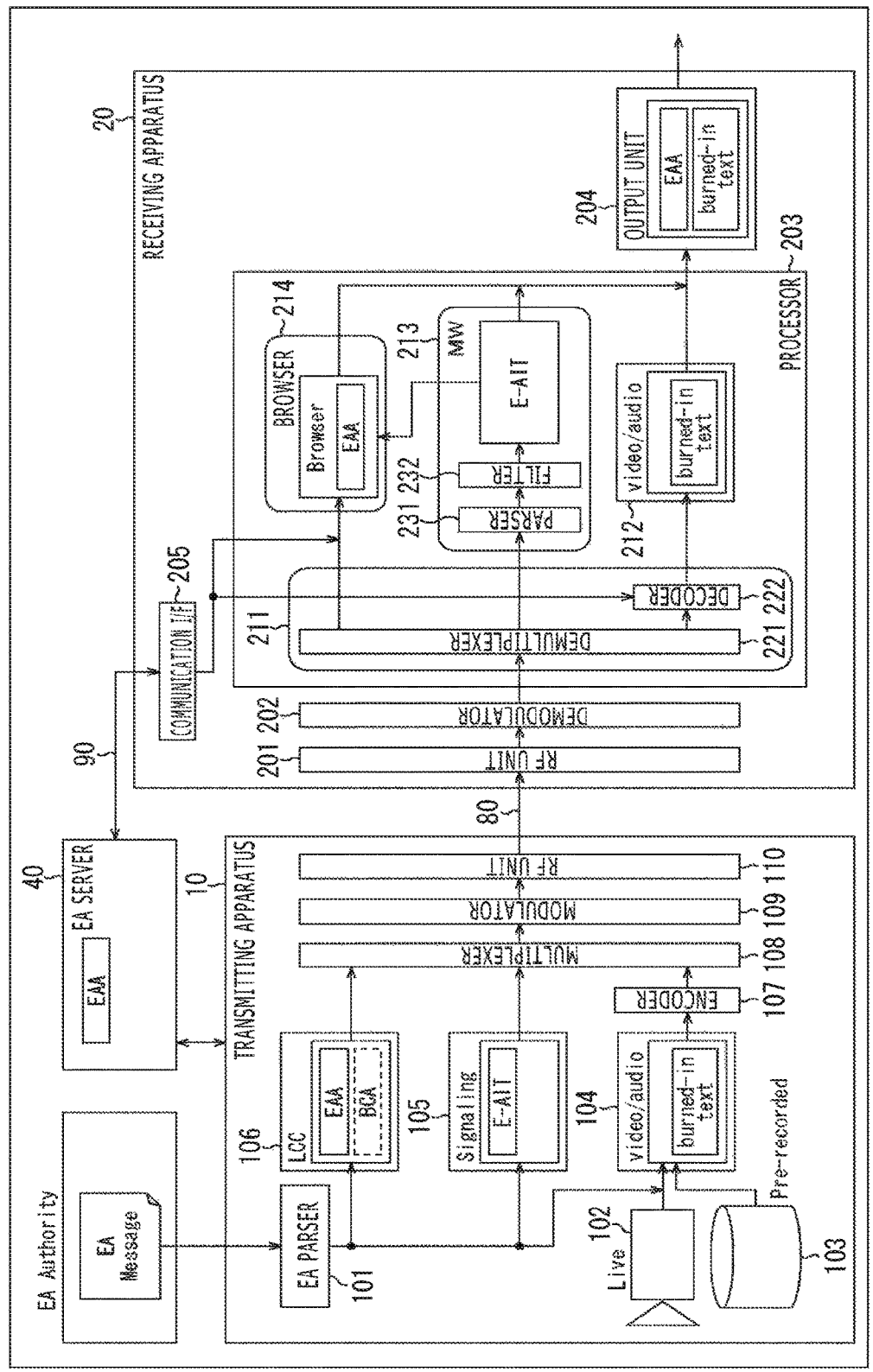
FIG. 19 is a diagram depicting a configurational example of apparatus of the transmission system.

FIG. 19 is a diagram depicting a configurational example of the apparatus of the transmission system 1.

As depicted in FIG. 19, the transmitting apparatus 10 includes an EA parser 101, a live contents acquiring unit 102, a storage 103, a component processing unit 104, a signaling data processing unit 105, an LCC processing unit 106, an encoder 107, a multiplexer 108, a modulator 109, and an RF unit 110.

The EA parser 101 acquires and analyzes CAP information as emergency information source information announced from an emergency information source (EA Authority) in case of emergency. The EA parser 101 supplies the result of the analysis of the CAP information to the component processing unit 104, the signaling data processing unit 105, or the LCC processing unit 106.

The live contents acquiring unit 102 acquires data of live contents (e.g., a live broadcast program such as a sports broadcast or the like) sent from a broadcasting place via a transmission path or a communication link, for example, in response to a request from the component processing unit 104, and supplies the acquired data to the component processing unit 104. The live contents include components such as video, audio, and subtitle data.

The storage 103 stores therein recorded contents (e.g., previously recorded programs of dramas or the like). In response to a request from the component processing unit 104, the storage 103 supplies recorded contents that have been recorded to the component processing unit 104. The recorded contents include components such as video, audio, and subtitle data.

The component processing unit 104 acquires live contents from the live contents acquiring unit 102 or recorded contents from the storage 103, processes video and audio components of the acquired contents, and supplies the processed video and audio components to the encoder 107.

The encoder 107 encodes the data of the video and audio components supplied from the component processing unit 104 according to a predetermined encoding process, and supplies the encoded data to the multiplexer 108.

Furthermore, in case of emergency, the receiving apparatus 20 displays a burned-in text (EA Text) on its screen. Therefore, the result of the analysis of the CAP information from the EA parser 101 is supplied to the component processing unit 104. In case the component processing unit 104 is supplied with the result of the analysis of the CAP information from the EA parser 101, the component processing unit 104 embeds an emergency alert (text information) according to the result of the analysis of the CAP information from the EA parser 101 into the video (uncompressed video data) of the contents (e.g., a live broadcast program or a previously recorded program). The encoder 107 encodes the video data with the emergency alert (text information) embedded therein according to the predetermined encoding process.

The signaling data processing unit 105 generates signaling data such as LLS signaling data or SLS signaling data, and supplies the generated signaling data to the multiplexer 108. For example, SLT meta data are generated as the LLS signaling data, and meta data such as USD, S-TSID, MPD, etc. are generated as the SLS signaling data.

Moreover, in case the signaling data processing unit 105 is supplied with the result of the analysis of the CAP information from the EA parser 101 in case of emergency, the signaling data processing unit 105 generates an E-AIT according to the result of the analysis, and supplies the generated E-AIT to the multiplexer 108. The E-AIT includes information about (detailed information of) an emergency alert, and control information for an emergency alert application (EAA).

In case LCC contents are to be provided, the LCC processing unit 106 generates LCC contents such as a broadcast application (BCA) or the like, and supplies the generated LCC contents to the multiplexer 108. In case the LCC processing unit 106 is supplied with the result of the analysis of the CAP information from the EA parser 101 in case of emergency, the LCC processing unit 106 generates an emergency alert application (EAA) based on the result of the analysis of the CAP information and supplies the generated emergency alert application (EAA) to the multiplexer 108.

The multiplexer 108 multiplexes a stream of components supplied from the encoder 107 and a stream of signaling data supplied from the signaling data processing unit 105, generating a multiplexed stream, and supplies the generated multiplexed stream to the modulator 109. In case LCC contents (e.g., a broadcast application (BCA) and an emergency alert application (EAA)) are to be provided, the multiplexer 108 also multiplexes a stream of LCC contents (e.g., a broadcast application (BCA) and an emergency alert application (EAA)) supplied from the LCC processing unit 106, in addition to the streams of the components and the signaling data, generating a multiplexed stream.

The modulator 109 performs an error correction coding process (e.g., a BCH coding process or an LDC coding process) and a modulating process (e.g., OFDM (Orthogonal Frequency Division Multiplexing) modulation or the like) on the data of the multiplexed stream supplied from the multiplexer 108, and supplies a signal produced from those processes to the RF unit 110.

The RF unit 110 converts the signal supplied from the modulator 109 into an RF (Radio Frequency) signal, and sends the RF signal as a digital broadcast signal according to the IP transmission scheme through an antenna (not depicted).

The transmitting apparatus 10 is configured as described above. In FIG. 19, the apparatus on the transmission side includes the transmitting apparatus 10, i.e., a single apparatus. However, it may include a transmitting system including a plurality of apparatus having the respective functions of the blocks depicted in FIG. 19. The transmitting apparatus 10 may have a communication function for providing an emergency alert application (EAA) from the transmitting apparatus 10 to an EA server 40.

As depicted in FIG. 19, the receiving apparatus 20 includes an RF unit 201, a demodulator 202, a processor 203, an output unit 204, and a communication I/F 205.

The RF unit 201 receives a digital broadcast signal according to the IP transmission scheme through an antenna (not depicted), frequency-converts the RF signal into an IF (Intermediate Frequency) signal, and supplies the IF signal to the demodulator 202. The RF unit 201 is constructed as an RF IC (Integrated Circuit).

The demodulator 202 performs a demodulating process (e.g., OFDM demodulation or the like) on the signal supplied from the RF unit 201. Moreover, the demodulator 202 performs an error correction decoding process (e.g., an LDPC decoding process or a BCH decoding process) on a demodulated single from the demodulating process, and supplies a signal obtained from the error correction decoding process to the processor 203. The demodulator 202 is constructed as a demodulator LSI (Large Scale Integration) circuit, for example.

The processor 203 performs a process (e.g., a decoding process) on the signal from the demodulator 202, and supplies video and audio data obtained from the process to the output unit 204.

The processor 203 is constructed as a main SoC (System on Chip). Specifically, the demodulator 202 as a demodulator LSI circuit and the processor 203 as a main SoC are constructed as different chips, and are connected to each other by a predetermined interface.

The processor 203 includes an FW/HW unit 211, a component processing unit 212, an MW unit 213, and a browser 214.

The FW/HW unit 211 includes firmware (FW) or hardware (HW), and processes the signal from the demodulator 202. The FW/HW unit 211 includes a demultiplexer 221 and a decoder 222.

The demultiplexer 221 is supplied with a multiplexed stream as the signal from the demodulator 202. The demultiplexer 221 separates the multiplexed stream into a stream of video and audio components and a stream of signaling data, and supplies the separated streams to the decoder 222 and the MW unit 213. If the multiplexed stream includes a stream of LCC contents (e.g., a broadcast application (BCA) and an emergency alert application (EAA)), then the demultiplexer 221 also separates the stream of LCC contents (e.g., a broadcast application (BCA) and an emergency alert application (EAA)), and supplies the separated stream to the browser 214.

The decoder 222 decodes the data of the video and audio components based on the streams of the components supplied from the demultiplexer 221, and supplies decoded data to the component processing unit 212. If an event message is included in the DASH segment, then the demultiplexer 221 and the decoder 222 analyze the event message, and control the browser 214 according to the result of the analysis.

The component processing unit 212 processes the video and audio data supplied from the decoder 222, and supplies the processed video and audio data to the output unit 204.

However, in case of emergency, an emergency alert (text information) is embedded in the video (uncompressed video data) of the contents (e.g., a live broadcast program or a previously recorded program), and displayed as a burned-in text.

The MW unit 213 includes middleware (MW) and processes the stream of signaling data supplied from the demultiplexer 221. The MW unit 213 includes a parser 231 and a filter 232. The parser 231 performs a process of analyzing target signaling data. The filter 232 performs a process of extracting target signaling data.

The processor 203 processes components, applications, etc. on the basis of the signaling data processed by the MW unit 213. However, in case of emergency, since the E-AIT is announced from the transmitting apparatus 10, the MW unit 213 analyzes the E-AIT and controls the browser 214 according to the result of the analysis. If an event message is included in the MPD, then the MW unit 213 analyzes the event message and controls the browser 214 according to the result of the analysis.

The browser 214 is a browser compatible with HTML5, for example, and executes a broadcast application (BCA) and an emergency alert application (EAA) supplied from the demultiplexer 221. Emergency detailed information is displayed by the emergency alert application (EAA) ("EAA" in the figure).

The output unit 204 processes the video data supplied from the component processing unit 212, and outputs the processed video data to a display unit (not depicted). The output unit 204 also processes the audio data supplied from the component processing unit 212, and outputs the processed audio data to speakers (not depicted). Therefore, the display unit displays the video of the contents such as a live broadcast program or a previously recorded program, and the speakers output sounds in synchronism with the video.

In case of emergency, however, the display unit displays the video of the contents such as a live broadcast program or the like in which a burned-in text according to an emergency alert is embedded. Furthermore, if an emergency alert application (EAA) is activated according to an E-AIT in case of emergency, then emergency detailed information is displayed in superposed relation to the video of the contents such as a live broadcast program or the like.

The communication I/F 205 exchanges various data with the EA server 40 through communication link 90 such as the Internet or the like.

For example, by requesting an emergency alert application (EAA) from the EA server 40 via the communication link 90 depending on the result of the analysis of the E-AIT, the communication I/F 205 can receive an emergency alert application (EAA) distributed from the EA server 40 and supply the received emergency alert application (EAA) to the browser 214 of the processor 203. The browser 214 is thus able to execute (activate) the emergency alert application (FAA) distributed from the EA server 40.

The receiving apparatus 20 is configured as described above. The receiving apparatus 20 may be a fixed receiver such as a television receiver, a set top box (STB), a video recorder, or the like, or a mobile receiver such as a mobile phone, a smartphone, a tablet terminal, or the like. Alternatively, the receiving apparatus 20 may be a vehicle-mounted device mounted on a vehicle. With the configuration of the receiving apparatus 20 depicted in FIG. 19, the display unit and the speakers are disposed outside of the receiving apparatus 20. However, the display unit and the speakers may be disposed within the receiving apparatus 20. Although not depicted in FIG. 19, the receiving apparatus 20 has a built-in resident application (RA), and various processes are performed by the resident application (RA).

(Activation Sequence of BCA and EAA)

Figure 20:
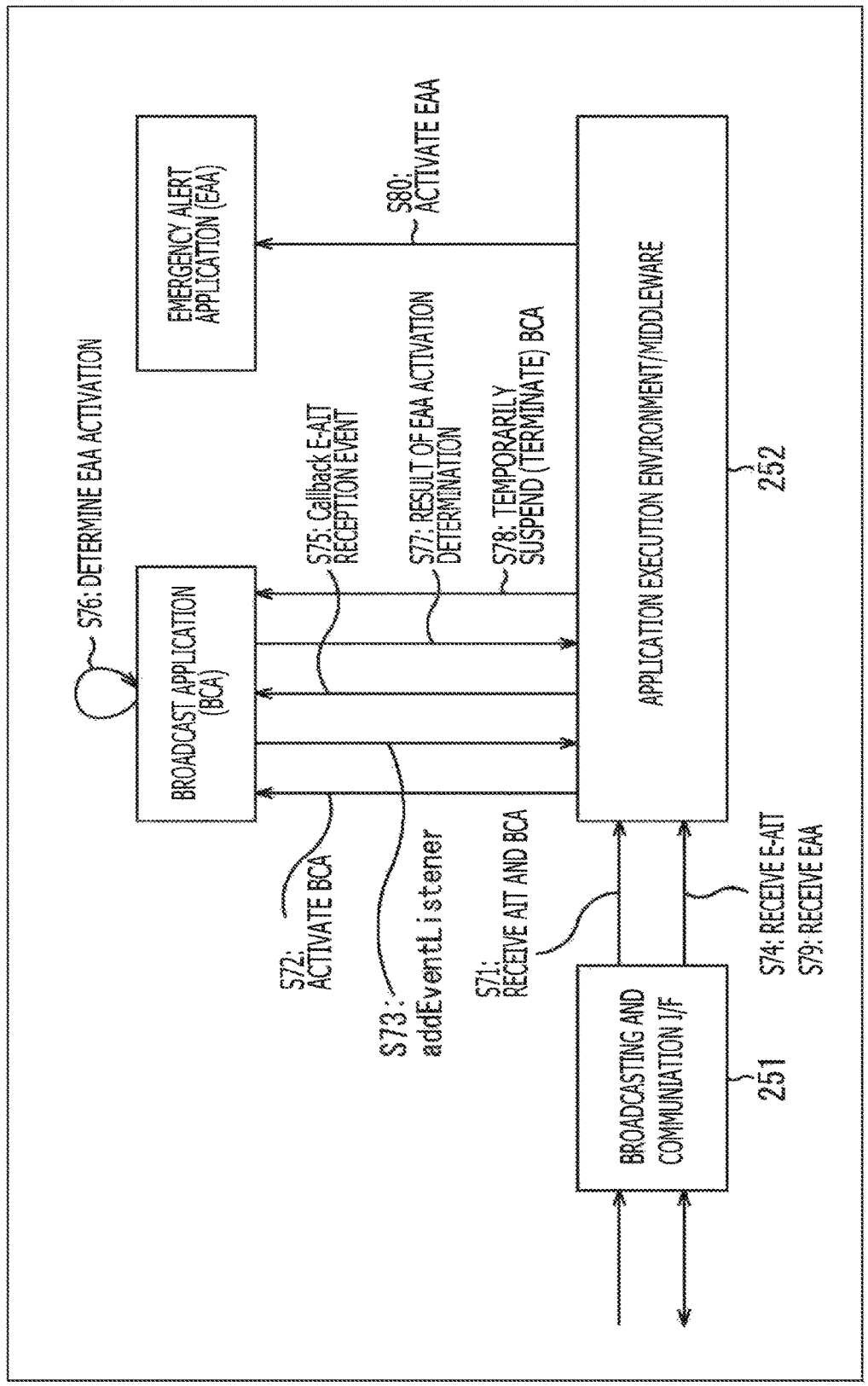
FIG. 20 is a diagram depicting an example of an activation sequence of HTML5 applications (BCA, EAA).

FIG. 20 is a diagram depicting an example of an activation sequence of HTML5 applications (BCA, EAA) in the receiving apparatus 20 depicted in FIG. 19.

In FIG. 20, a broadcasting and communication I/F 251 corresponds to the RF unit 201 and the demodulator 202 that function as a broadcasting I/F and the communication I/F 205 that functions as a communication I/F in the receiving apparatus 20 depicted in FIG. 19. An application execution environment/middleware 252 corresponds to the MW unit 213 and the browser 214 of the processor 203 in the receiving apparatus 20 depicted in FIG. 19.

With the receiving apparatus 20 depicted in FIG. 19, when an AIT is received by the broadcasting and communication I/F 251, the application execution environment/middleware 252 analyzes the AIT. A broadcast application (BCA) is received depending on the result of the analysis (S71). The application execution environment/middleware 252 activates the broadcast application (BCA) received by the broadcasting and communication I/F 251 (S72).

The activated broadcast application (BCA) registers a particular event (e.g., an E-AIT reception event) in the application execution environment/middleware 252 according to an addEventListener method (S73). The application execution environment/middleware 252 is now ready to announce a particular event (e.g., an E-AIT reception event) to the broadcast application (BCA) when such a particular event is issued.

When an E-AIT is received by the broadcasting and communication I/F 251 (S74), the application execution environment/middleware 252 issues a callback event, and the E-AIT reception event is announced to the broadcast application (BCA) (S75). Here, the E-AIT is supplied from the application execution environment/middleware 252 to the broadcast application (BCA).

The broadcast application (BCA) analyzes the E-AIT, and performs a process of determining whether an emergency alert application (EAA) is to be activated or not (S76). In the determining process, it is decided that an emergency alert application (FAA) is to be activated, for example, and the result of the EAA activation decision is announced to the application execution environment/middleware 252 (S77).

In case an emergency alert application (FAA) is to be activated on the basis of the result of the EAA activation decision from the broadcast application (BCA), the application execution environment/middleware 252 temporarily suspends the broadcast application (BCA) that is being activated (S78). When the broadcasting and communication I/F 251 receives an emergency alert application (EAA) (S79), the application execution environment/middleware 252 activates the emergency alert application (EAA) (S80).

In the receiving apparatus 20 depicted in FIG. 19, the broadcast application (BCA) and the emergency alert application (EAA) are activated in the manner described above. The activation sequence depicted in FIG. 20 is by way of example. In this example, the broadcast application (BCA) performs a process of determining whether an emergency alert application (EAA) is to be activated or not. However, the application execution environment/middleware 252 may perform a process of determining whether an emergency alert application (EAA) is to be activated or not as with the example described above.

According to the activation sequence depicted in FIG. 20, the broadcast application (BCA) registers an E-AIT reception event as a particular event according to an addEventListener method. However, the broadcast application (BCA) may similarly register and process other events. For example, by registering an event message according to the addEventListener method, the announcement of an event message can be received at the timing of issuance of a callback event.

<3. The Flows of Processes Carried Out by the Respective Apparatus>

Next, the flows of processes carried out by the respective apparatus that make up the transmission system 1 depicted in FIG. 1 will be described below with reference to flowcharts depicted in FIGS. 21 through 28.

(The Flow of a Transmission Process)

The flow of a transmission process carried out by the transmitting apparatus 10 depicted in FIG. 19 will first be described below with reference to the flowchart depicted in FIG. 21.

In step S101, the component processing unit 104 and the encoder 107 perform a component process.

In the component process, live contents (e.g., a live broadcast program) acquired by the live contents acquiring unit 102 or recorded contents (e.g., a previously recorded program) stored in the storage 103 are acquired, and a process such as an encoding process according to a predetermined encoding process is carried out on the video and audio components that make up the acquired contents.

For displaying a burned-in text on the screen of the receiving apparatus 20 in case of emergency, an emergency alert (text information) according to the result of the analysis of the CAP information from the EA parser 101 is embedded into the video (uncompressed video data) of the contents (e.g., a live broadcast program or a previously recorded program), and then encoded in the component process.

In step S102, the signaling data processing unit 105 performs a signaling process.

In the signaling process, signaling data such as LLS signaling data or SLS signaling data are generated and processed. For example, an AIT for controlling operation of a broadcast application (BCA) is generated as signaling data.

In case of emergency, an E-AIT according to the result of the analysis of the CAP information from the EA parser 101 is generated as LLS signaling data in the signaling process. The E-AIT includes information about (detailed information of) an emergency alert, and control information for an emergency alert application (EAA).

In step S103, the LLC processing unit 106 performs an application process.

In the application process, a broadcast application (BCA) is generated as LCC contents. In case of emergency, an emergency alert application (EAA) according to an emergency alert from the EA parser 101 is generated as LCC contents in the application process. The broadcast application (BCA) and the emergency alert application (EAA) are applications developed in HTML5.

In step S104, the multiplexer 108 performs a multiplexed stream generating process.

In the multiplexed stream generating process, a stream of components obtained by the processing of step S101 and a stream of signaling data obtained by the processing of step S102 are multiplexed, generating a multiplexed stream. In case of emergency, an E-AIT is included in the signaling data. In case of emergency, a stream of an emergency alert application (EAA) is also multiplexed.

In step S105, the modulator 109 and the RF unit 110 perform a broadcast stream transmitting process.

In the broadcast stream transmitting process, the multiplexed stream generated by the processing of step S104 is sent as a digital broadcast signal according to the IP transmission scheme.

Figure 21:
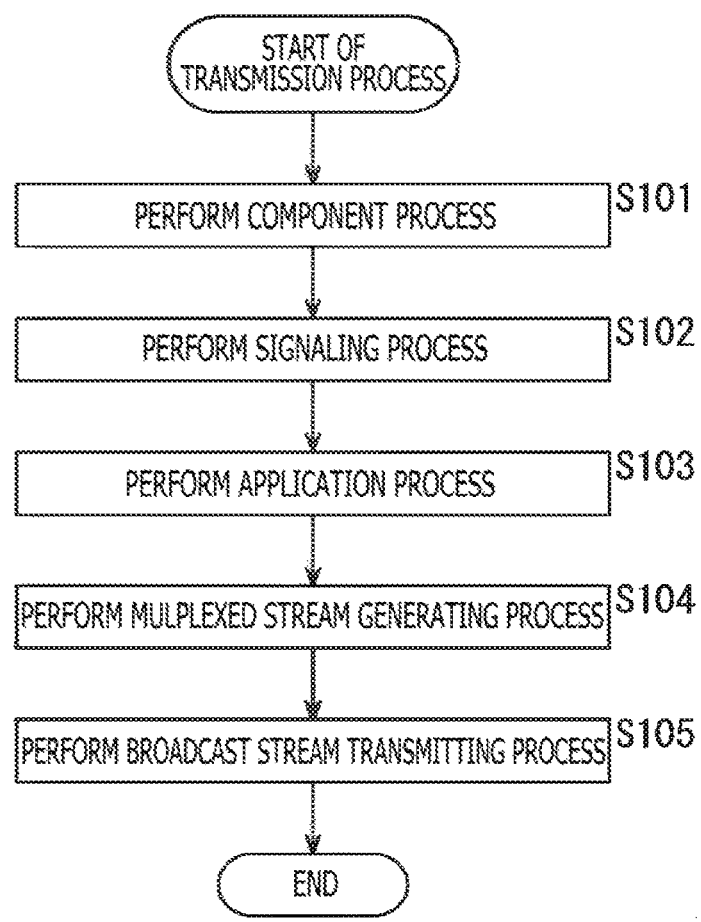
FIG. 21 is a flowchart illustrative of the flow of a transmitting process.

When the processing of step S105 is finished, the transmission process depicted in FIG. 21 is ended.

The flow of the transmission process has been described above.

(The Flow of a Reception Process on Power-Off and Standby)

Figure 22:
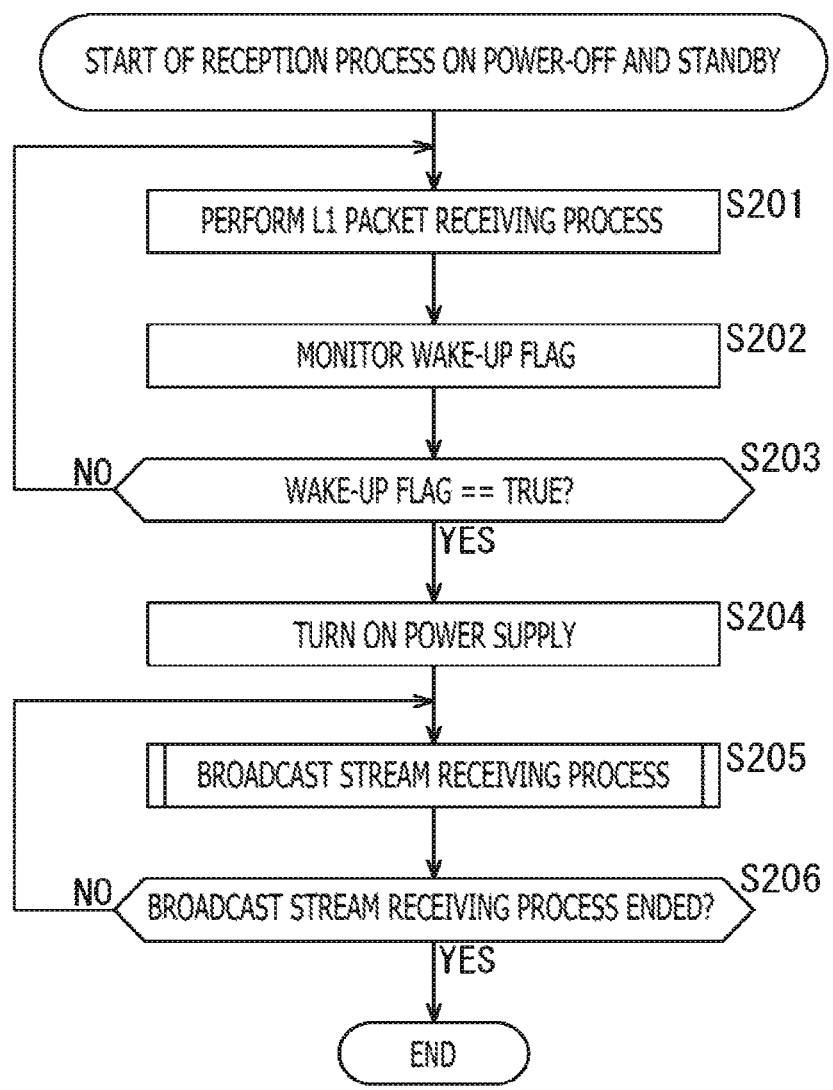
FIG. 22 is a flowchart illustrative of the flow of a receiving process on power-off and standby.

Next, the flow of a reception process on power-off and standby, which is carried out by the receiving apparatus 20 depicted in FIG. 19, will be described below with reference to the flowchart depicted in FIG. 22. The processing of the flowchart depicted in FIG. 22 is carried out on the premise that the receiving apparatus 20 is on power-off and standby, i.e., only the RF unit 201 and the demodulator 202 are operational in the receiving apparatus 20.

In step S201, the RF unit 201 and the demodulator 202 perform an L1 packet receiving process.

In the L1 packet receiving process, a digital broadcast signal from the transmitting apparatus 10 is received, and an L1 frame transmitted as the digital broadcast signal is acquired.

In step S202, the demodulator 202 monitors a wake-up flag included in an L1 header of the L1 frame acquired by the processing of step S201.

In step S203, it is determined whether the wake-up flag is "TRUE" or not on the basis of the result of the monitoring in step S202. If it is decided that the wake-up flag is "FALSE" in step S203, then processing goes back to step S201, and the processing of steps S201 through S203 is repeated.

If it is decided that the wake-up flag is "TRUE" in step S203, then processing goes to step S204. In step S204, the receiving apparatus 20 is powered up. In the receiving apparatus 20, the other blocks than the RF unit 201 and the demodulator 202, such as the processor 203, the output unit 204, etc., become operational.

When all the functions of the receiving apparatus 20 become executable by the processing of step S204, processing goes to step S205. In step S205, a broadcast stream receiving process is carried out.

In the broadcast stream receiving process, video and audio components are processed on the basis of signaling data, reproducing video and sound data of contents. In case of emergency, an emergency alert such as a burned-in text and emergency detailed information according to an emergency alert application (EAA) are displayed. Details of the broadcast stream receiving process will be described later with reference to the flowchart depicted in FIG. 24.

In step S206, it is determined whether the broadcast stream receiving process in step S205 is to be terminated or not. If it is decided that the broadcast stream receiving process is to be continued in step S206, then processing goes back to step S205, and the processing of steps S205 and S206 is repeated. If it is decided that the broadcast stream receiving process is to be terminated in step S206, the reception process on power-off and standby depicted in FIG. 22 is ended.

The flow of the reception process on power-off and standby has been described above.

(The Flow of a Reception Process on Power-Off)

Figure 23:
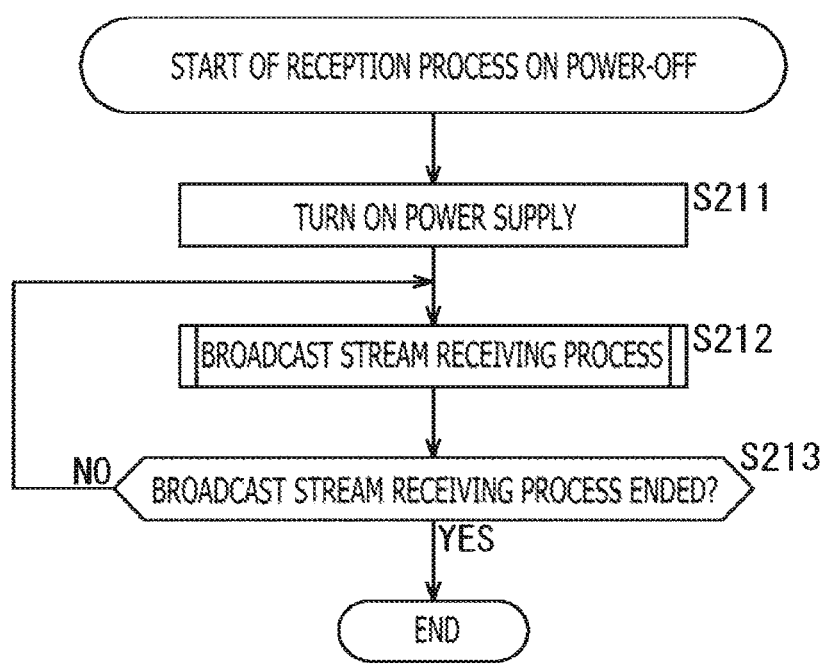
FIG. 23 is a flowchart illustrative of the flow of a receiving process on power-off.

Next, the flow of a reception process on power-off, which is carried out by the receiving apparatus 20 depicted in FIG. 19, will be described below with reference to the flowchart depicted in FIG. 23. The processing of the flowchart depicted in FIG. 23 is carried out on the premise that the receiving apparatus 20 is on power-off, i.e., all the functions of the receiving apparatus 20 are not executable.

In step S211, the receiving apparatus 20 is powered up by an operation of the user, for example.

When all the functions of the receiving apparatus 20 become executable by the processing of step S211, processing goes to step S212. In step S212, the broadcast stream receiving process is performed.

In the broadcast stream receiving process, video and audio components are processed on the basis of signaling data, reproducing video and sound data of contents. In case of emergency, an emergency alert such as a burned-in text and emergency detailed information according to an emergency alert application (EAA) are displayed. Details of the broadcast stream receiving process will be described later with reference to the flowchart depicted in FIG. 24.

In step S213, it is determined whether the broadcast stream receiving process in step S212 is to be terminated or not. If it is decided that the broadcast stream receiving process is to be continued in step S213, then processing goes back to step S212, and the processing of steps S212 and S213 is repeated. If it is decided that the broadcast stream receiving process is to be terminated in step S213, the reception process on power-off depicted in FIG. 23 is ended.

The flow of the reception process on power-off has been described above.

(The Flow of the Broadcast Stream Receiving Process)

Next, the flow of the broadcast stream receiving process that corresponds to the processing of step S205 depicted in FIG. 22 or the processing of step S212 depicted in FIG. 23 will be described below with reference to the flowchart depicted in FIG. 24.

In step S221, the demultiplexer 221 performs a packet receiving process. In the packet receiving process, an ALP packet and an IP/UDP packet are processed from the L1 frame processed by the demodulator 202.

In step S222, it is determined whether LLS signaling data (LLS table) have been acquired on the basis of the packet obtained by the processing of step S221 or not. If it is decided that LLS signaling data have been acquired in step S222, then processing goes to step S223.

In step S223, the MW unit 213 determines a type and version of the LLS signaling data. As described above with reference to FIG. 4, a type and version of the LLS signaling data is determined by analyzing the LLS table LD and LLS table version included in (the LL header) of the LLS table.

In step S224, the MW unit 213 determines whether the LLS signaling data have been updated or not on the basis of the result of the determination in step S223. If it is decided that the LLS signaling data have been updated in step S224, processing goes to step S225.

In step S225, the MW unit 213 determines whether the LLS signaling data represent an E-AIT or not on the basis of the result of the determination in step S223. If it is decided that the LLS signaling data represent an E-AIT in step S225, processing goes to step S226.

In step S226, an E-AIT receiving process is performed. In the E-AIT receiving process, a process with respect to an emergency alert application (EAA) that presents emergency detailed information depending on the E-AIT is carried out. Details of the E-AIT receiving process will be described later with reference to the flowcharts depicted in FIGS. 25 through 27.

If the LLS signaling data do not represent an E-AIT in step S225, then processing goes to step S227. In step S227, another LLS signaling data receiving process is performed. In this LLS signaling data receiving process, a process on LLS signaling data other than an E-AIT such as SLT meta data or the like is performed.

If it is decided that the LLS signaling data have not been updated in step S224, then since there is no need to process the LLS signaling data, the processing of steps S225 through S227 is skipped. When the processing of step S226 or S227 is finished, the broadcast stream receiving process depicted in FIG. 24 is ended, and processing goes back to step S205 depicted in FIG. 22 or step S212 depicted in FIG. 23, performing the processing subsequent thereto.

If it is decided that LLS signaling data have not been acquired in step S222, then processing goes to step S228. In step S228, the type of a target ROUTE session is determined. According to ATSC3.0, as described above, components and signaling data may be transmitted in an MMT session. For the sake of brevity, only a situation in which a ROUTE session is used will be described.

If it is decided that the type of a ROUTE session is components of video and audio data, etc. in step S228, then processing goes to step S229. In steps S229 through S232, a process with respect to components that are transmitted in a ROUTE session is carried out.

Specifically, in step S229, the decoder 222 and the component processing unit 212 performs a component receiving process. In the component receiving process, a decoding process according to a predetermined decoding process is performed on video and audio components that make up contents such as a broadcast program or the like.

In step S230, the output unit 204 performs a rendering process. In the rendering process, video and sound data of the contents such as a broadcast program or the like are reproduced on the basis of the result of the processing of step S229, and are output.

In step S231, the FW/HW unit 211 determines whether an event message is included in an event message box of a DASH segment transmitted in a ROUTE session or not. If it is decided that an event message is included in step S231, then processing goes to step S232.

In step S232, the FW/HW unit 211 (or the MW unit 213) performs an event process. In the event process, a process with respect to an emergency alert application (EAA) is performed at a predetermined timing depending on the event message placed in the event message box of the DASH segment. Details of the event process will be described later with reference to the flowchart depicted in FIG. 28. If it is decided that an event message is not included in step S231, then the processing of step S232 is skipped.

If it is decided that the type of a ROUTE session is signaling data in step S228, then processing goes to step S233. In steps S233 through S237, a process with respect to SLS signaling data transmitted in a ROUTE session is carried out.

Specifically, the MW unit 213 performs an SLS signaling data receiving and analyzing process in step S233. In the signaling data receiving and analyzing process, SLS signaling data that are meta data such as USD, MPD, etc. transmitted in a ROUTE session are acquired and analyzed.

In step S234, it is determined whether the SLS signaling data have been updated or not on the basis of the result of the analysis in step S233. If it is decided that the SLS signaling data have been updated in step S234, then processing goes to step S235.

In step S235, the updated content of the SLS signaling data is reflected on the basis of the result of the analysis in step S233. If it is decided that the SLS signaling data have not been updated in step S234, then the processing of step S235 is skipped.

In step S236, the MW unit 213 determines whether an event message is included in an EventStream element of an MPD or not on the basis of the result of the analysis in step S233. If it is decided that an event message is included in step S236, then processing goes to step S237.

In step S237, the MW unit 213 performs an event process. In this event process, a process with respect to an emergency alert application (EAA) is performed at a predetermined timing depending on the event message placed in the EventStream element of the MPD. Details of the event process will be described later with reference to the flowchart depicted in FIG. 28. If it is decided that an event message is not included in step S236, then the processing of step S237 is skipped.

If it is decided that the type of a ROUTE session is LCC contents in step S228, then processing goes to step S238. In steps S238 and S239, a process with respect to LLC contents transmitted in a ROUTE session is carried out.

Specifically, in step S238, an LCC contents receiving process is performed to acquire LCC contents such as an application (e.g., a broadcast application (BCA)) and contents for storage. In step S239, a local cache process is performed to store (download) the LCC contents acquired in the process of step S238 into a storage (not depicted).

Figure 24:
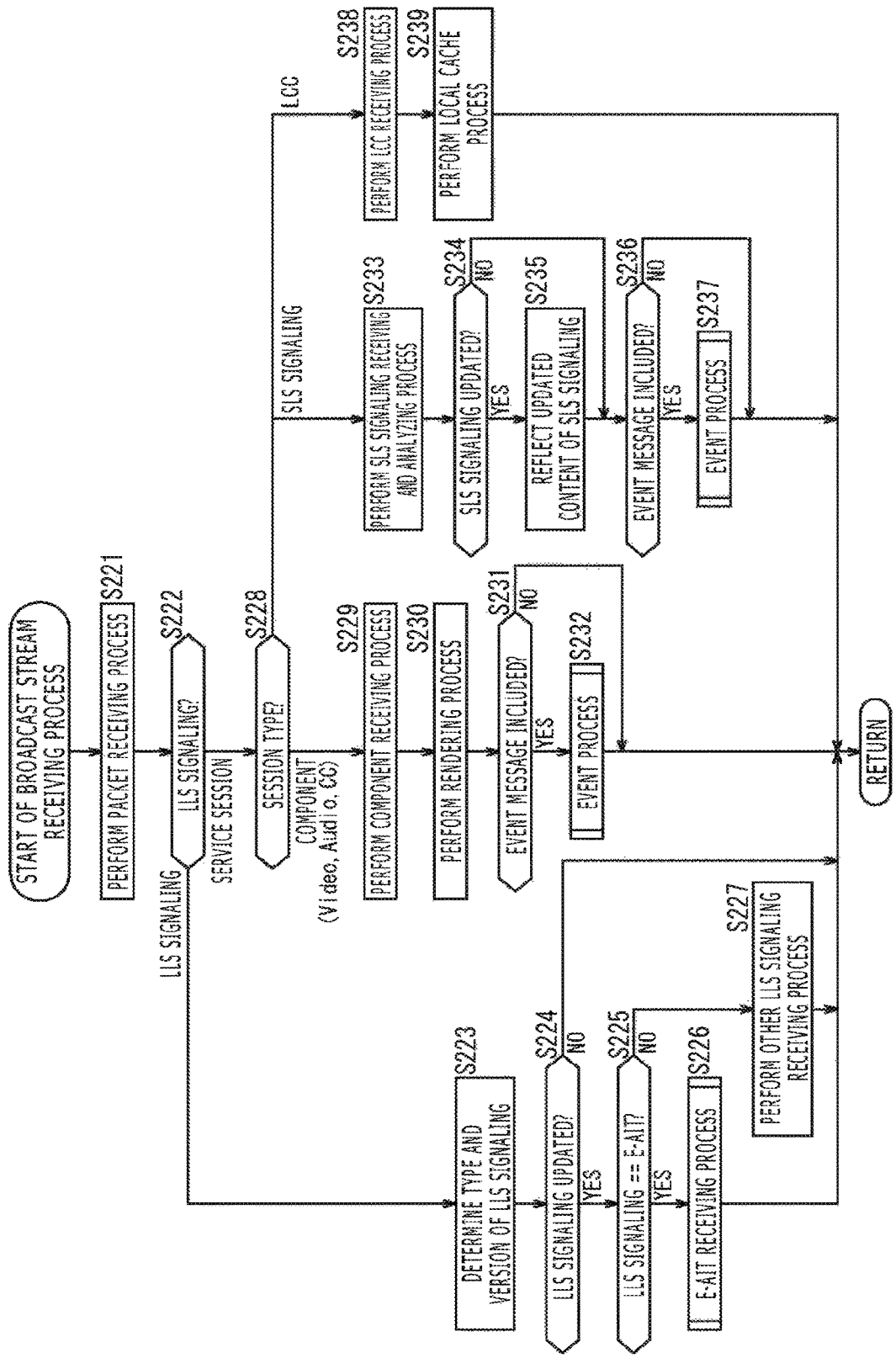
FIG. 24 is a flowchart illustrative of the flow of a broadcast stream receiving process.

When the processing of step S232, S237, or S239 is finished, the broadcast stream receiving process depicted in FIG. 24 is ended, and processing goes back to step S205 depicted in FIG. 22 or step S212 depicted in FIG. 23, performing the processing subsequent thereto.

The broadcast stream receiving process has been described above.

(The Flow of E-AIT Receiving Processes)

Details of E-AIT receiving processes which correspond to the processing of step S226 depicted in FIG. 24 will be described below with reference to the flowcharts depicted in FIGS. 25 through 27.

First, an E-AIT receiving process in case an emergency alert application (EAA) is activated according to a first procedure will be described below with reference to the flowchart depicted in FIG. 25. Since an E-AIT is received during a period in which an emergency alert is announced from the transmitting apparatus 10, a burned-in text has been displayed as an emergency alert message (Universal Alert) on the screen of the receiving apparatus 20 at the time the flowchart depicted in FIG. 25 is started.

In step S241, the resident application (RA) performs a process of analyzing an E-AIT received as LLS signaling data. The E-AIT includes, set therein, information (basic information) indicating the urgency, severity, target region, category, and priority of the emergency alert, and, in addition, automatic activation (autostart) of an emergency alert application (EAA) as a control code.

In step S242, the resident application (RA) presents a summary of the emergency alert on the basis of the result of the analysis in step S241. For example, selection information indicating whether emergency detailed information depending on the basic information (e.g., urgency, target region, etc.) included in the E-AIT is to be presented or not is displayed as an EA icon on the screen of the receiving apparatus 20 (e.g., D13 in FIG. 6).

In step S243, it is determined whether the presentation of emergency detailed information has been indicated by the user who has confirmed the summary of the emergency alert (e.g., selection information such as an EA icon or the like) presented by the processing of step S242.

If a "YES" button displayed as the EA icon, for example, is operated in step S243, then since the presentation of emergency detailed information is indicated, processing goes to step S244. In this case, the resident application (RA)

issues an activation event for an emergency alert application (EAA) (EAA activation event).

In step S244, the browser 214 acquires and activates an emergency alert application (EAA) transmitted as LCC contents in response to the EAA activation event issued by the resident application EA. The receiving apparatus 20 displays on its screen emergency detailed information by the emergency alert application (EAA), together with a character string of a burned-in text, in superposed relation to the video of a broadcast program (e.g., D14 in FIG. 6).

On the other hand, if a "NO" button displayed as the EA icon, for example, is operated in step S243, then since the presentation of emergency detailed information is refused, the processing of step S244 is skipped. When the processing of step S244 is finished, processing goes back to step S226 depicted in FIG. 24, performing the processing subsequent thereto.

In the processing of steps S242 and S243, the selection information (e.g., an EA icon) according to the basic information included in the E-AIT is displayed, and it is determined whether emergency detailed information is to be presented or not depending on an operation of the user. However, this determining process is not restrictive, but it may be determined whether emergency detailed information is to be presented or not on the basis of set information that has been set in advance by the user (such that, e.g., information about the weather is to be displayed, but information about an emergency school closure is not to be displayed).

If a broadcast application (BCA) has been activated when an emergency alert application (EAA) is to be activated by the processing of step S244, then broadcast application (BCA) that is being activated is temporarily suspended or terminated, and then emergency alert application (EAA) is activated.

The E-AIT receiving process in case an emergency alert application (EAA) is activated according to the first procedure has been described above.

Next, the flow of an E-AIT receiving process in case an emergency alert application (EAA) is activated according to a second procedure or a third procedure will be described below with reference to the flowchart depicted in FIG. 26. Since an E-AIT is received during a period in which an emergency alert is announced from the transmitting apparatus 10, a burned-in text has been displayed as an emergency alert message (Universal Alert) on the screen of the receiving apparatus 20 at the time the flowchart depicted in FIG. 26 is started.

In step S251, the MW unit 213 performs a process of analyzing an E-AIT received as LLS signaling data. The E-AIT includes, set therein, information (basic information) indicating the urgency, severity, target region, category, and priority of the emergency alert, and, in addition, automatic activation (autostart) of an emergency alert application (EAA) as a control code.

In step S252, the MW unit 213 determines whether a broadcast application (BCA) is being activated or not.

If it is decided that a broadcast application (BCA) is being activated in step S252, then processing goes to step S253. As this branch corresponds to the third procedure, a process about the third procedure is carried out in steps S253 through S256.

In step S253, the MW unit 213 performs an event notifying process. In the event notifying process, as described with reference to FIG. 20, if a broadcast application (BCA) that is being activated has registered an E-AIT reception event according to an addEventListener method, for example, a callback event is issued, and the E-AIT reception event is announced to the broadcast application (BCA).

In step S254, the MW unit 213 (or the broadcast application (BCA)) determines whether an emergency alert application (EAA) is to be activated or not on the basis of the result of the analysis of step S251. It is possible here to determine whether an emergency alert application (EAA) is to be activated or not according to an instruction from the user or set information (e.g., settings such as a display target region, a display target item, etc.), for example.

If it is decided that an emergency alert application (EAA) is to be activated in step S254, then processing goes to step S255. In this case, the MW unit 213 issues an activation event for an emergency alert application (EAA) (EAA activation event).

In step S255, the browser 214 temporarily suspends or terminals the broadcast application (BCA) that is being activated according to the EAA activation event issued from the MW unit 213.

In step S256, the browser 214 acquires and activates an emergency alert application (EAA) transmitted as LCC contents according to the EAA activation event issued from the MW unit 213. The receiving apparatus 20 now displays on its screen emergency detailed information according to the emergency alert application (EAA), together with a character string of a burned-in text, in superposed relation to the video of a broadcast program (e.g., D34 in FIG. 8).

If it is decided that an emergency alert application (EAA) is not to be activated in step S254, then the processing of steps S255 and S256 is skipped.

If it is decided that a broadcast application (BCA) is not being activated in step S252, then processing goes to step S257. As this branch corresponds to the second procedure, a process about the second procedure is carried out in steps S257 and S258.

In step S257, the MW unit 213 determines whether an emergency alert application (EAA) is to be activated or not on the basis of the result of the analysis of step S251. It is possible here to determine whether an emergency alert application (EAA) is to be activated or not according to an instruction from the user or set information (e.g., settings such as a display target region, a display target item, etc.), for example.

If it is decided that an emergency alert application (EAA) is to be activated in step S257, then processing goes to step S258. In this case, the MW unit 213 issues an activation event for an emergency alert application (EAA) (EAA activation event).

In step S258, the browser 214 acquires and activates an emergency alert application (EAA) transmitted as LCC contents according to the EAA activation event issued from the MW unit 213. The receiving apparatus 20 now displays on its screen emergency detailed information according to the emergency alert application (EAA), together with a character string of a burned-in text, in superposed relation to the video of a broadcast program (e.g., D24 in FIG. 7).

If it is decided that an emergency alert application (EAA) is not to be activated in step S257, then the processing of step S258 is skipped.

When the processing of step S256 or S258 is finished, processing goes back to step S226 depicted in FIG. 24, performing the processing subsequent thereto.

The E-AIT receiving process in case an emergency alert application (EAA) is activated according to the second procedure or the third procedure has been described above.

Next, the flow of an E-AIT receiving process in case an emergency alert application (EAA) is terminated according to first through third procedures will be described below with reference to the flowchart depicted in FIG. 27.

Figure 25:
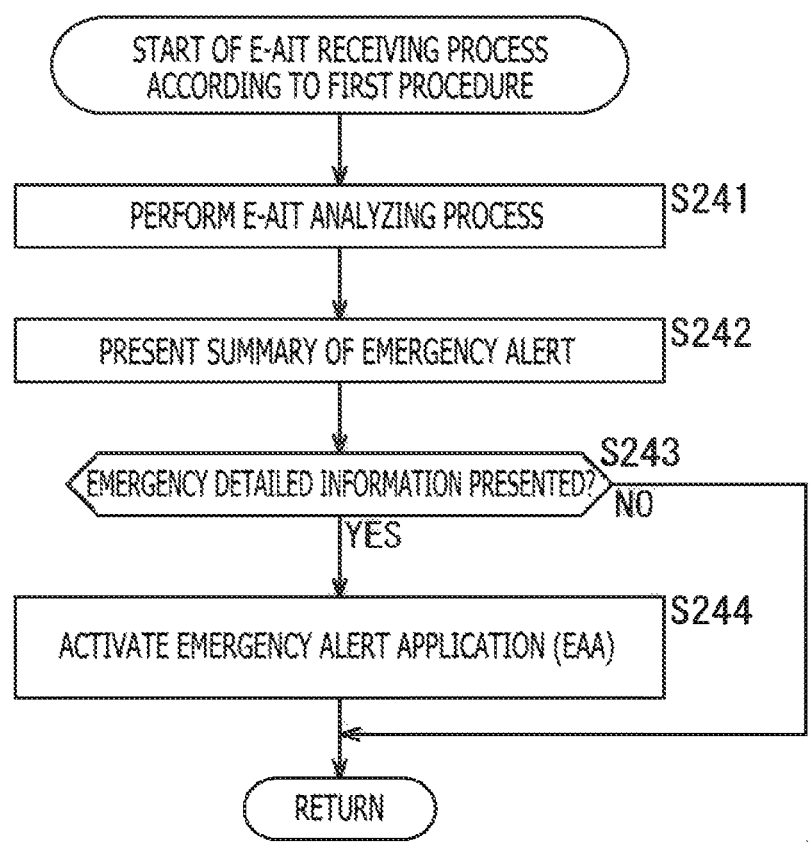
FIG. 25 is a flowchart illustrative of the flow of an E-AIT receiving process according to a first procedure.
Figure 26:
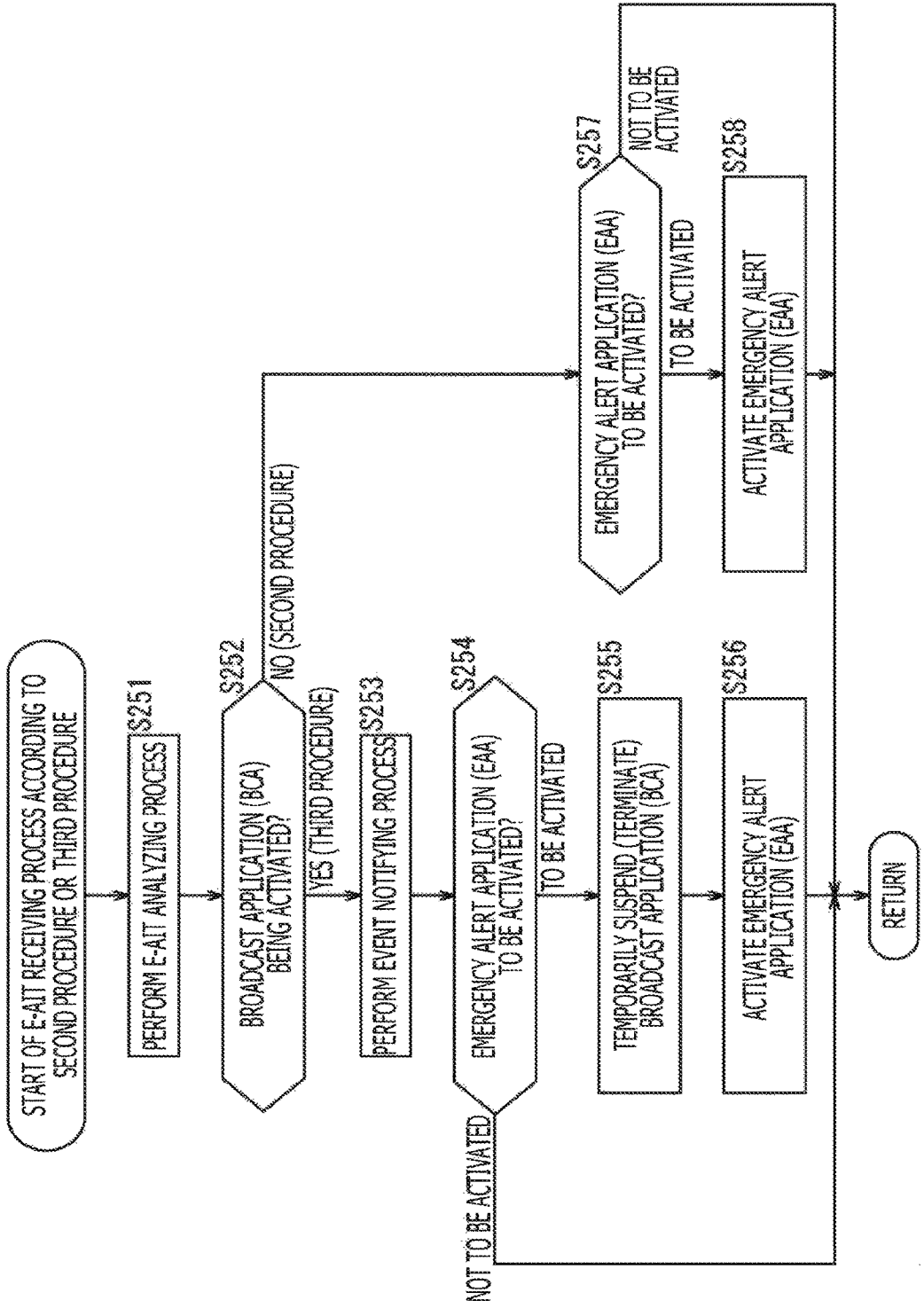
FIG. 26 is a flowchart illustrative of the flow of an E-AIT receiving process according to second and third procedures.
Figure 27:
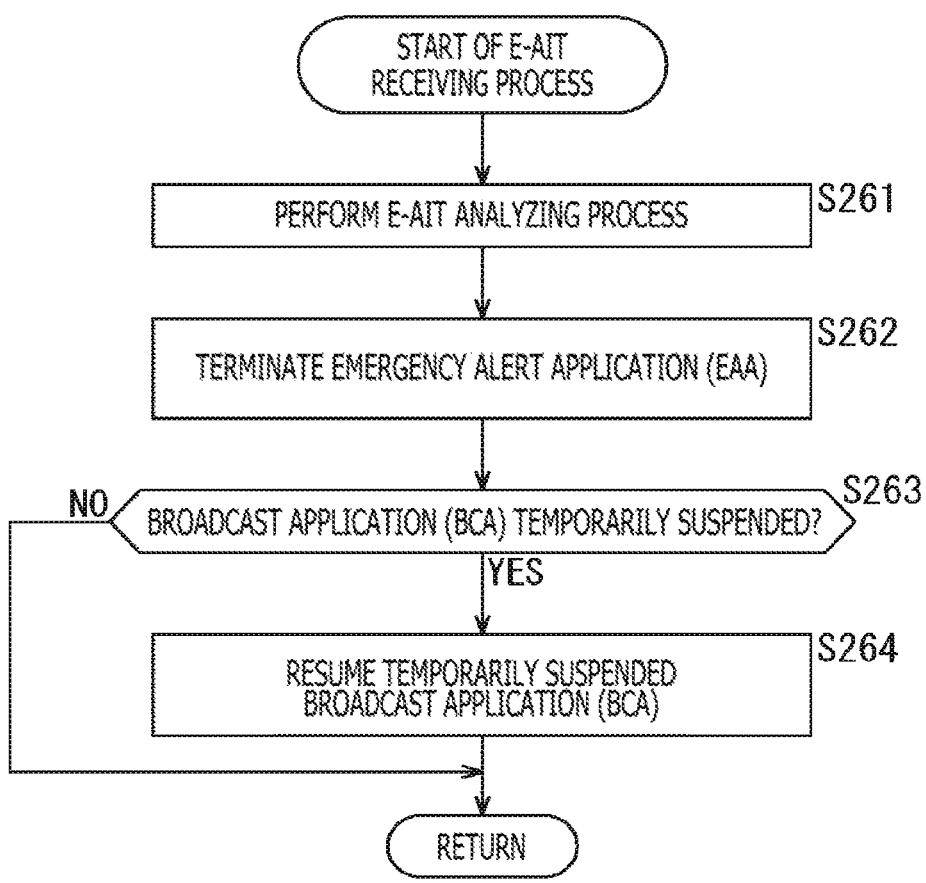
FIG. 27 is a flowchart illustrative of the flow of an E-AIT receiving process.

The processing of the flowchart depicted in FIG. 27 is carried out on the premise that the processing of the flowchart depicted in FIG. 25 or 26 described above has been carried out, so that an emergency alert application (EAA) has been activated. Therefore, the receiving apparatus 20 is displaying on its screen emergency detailed information depending on advanced contents, together with the burned-in text as the emergency alert message (Universal Alert) (e.g., D14 in FIG. 6, D24 in FIG. 7, and D34 in FIG. 8).

In step S261, the MW unit 213 performs a process of analyzing an E-AIT received as LLS signaling data. The E-AIT includes, set therein, termination (terminate) of an emergency alert application (EAA) as a control code. Here, the MW unit 213 issues a termination event for an emergency alert application (EAA) (EAA termination event).

In step S262, the browser 214 terminates the emergency alert application (EAA) that is being activated according to the EAA termination event issued from the MW unit 213.

In step S263, the MW unit 213 (or the browser 214) determines whether the broadcast application (BCA) is being temporarily suspended or not. Here, it is determined whether the processing of step S255 depicted in FIG. 26 has temporarily suspended the broadcast application (BCA) being activated.

If it is decided that the broadcast application (BCA) is being temporarily suspended in step S263, then processing goes to step S264. In this case, the MW unit 213 issues an event for resuming the execution of the broadcast application (BCA) (BCA resumption event).

In step S264, the browser 214 resumes the execution of the broadcast application (BCA) that is being suspended according to the BCA resumption event issued from the MW unit 213. The receiving apparatus 20 then displays on its screen information of the broadcast application (BCA) in superposed relation to the video of the broadcast program.

If it is decided that the broadcast application (BCA) is not being temporarily suspended in step S263, then the processing of step S264 skipped. When the processing of step S264 is finished, processing goes back to step S226 depicted in FIG. 24, performing the processing subsequent thereto.

The flow of the E-AIT receiving process in case the emergency alert application (EAA) is terminated according to first through third procedures has been described above. (Event process)

Figure 28:
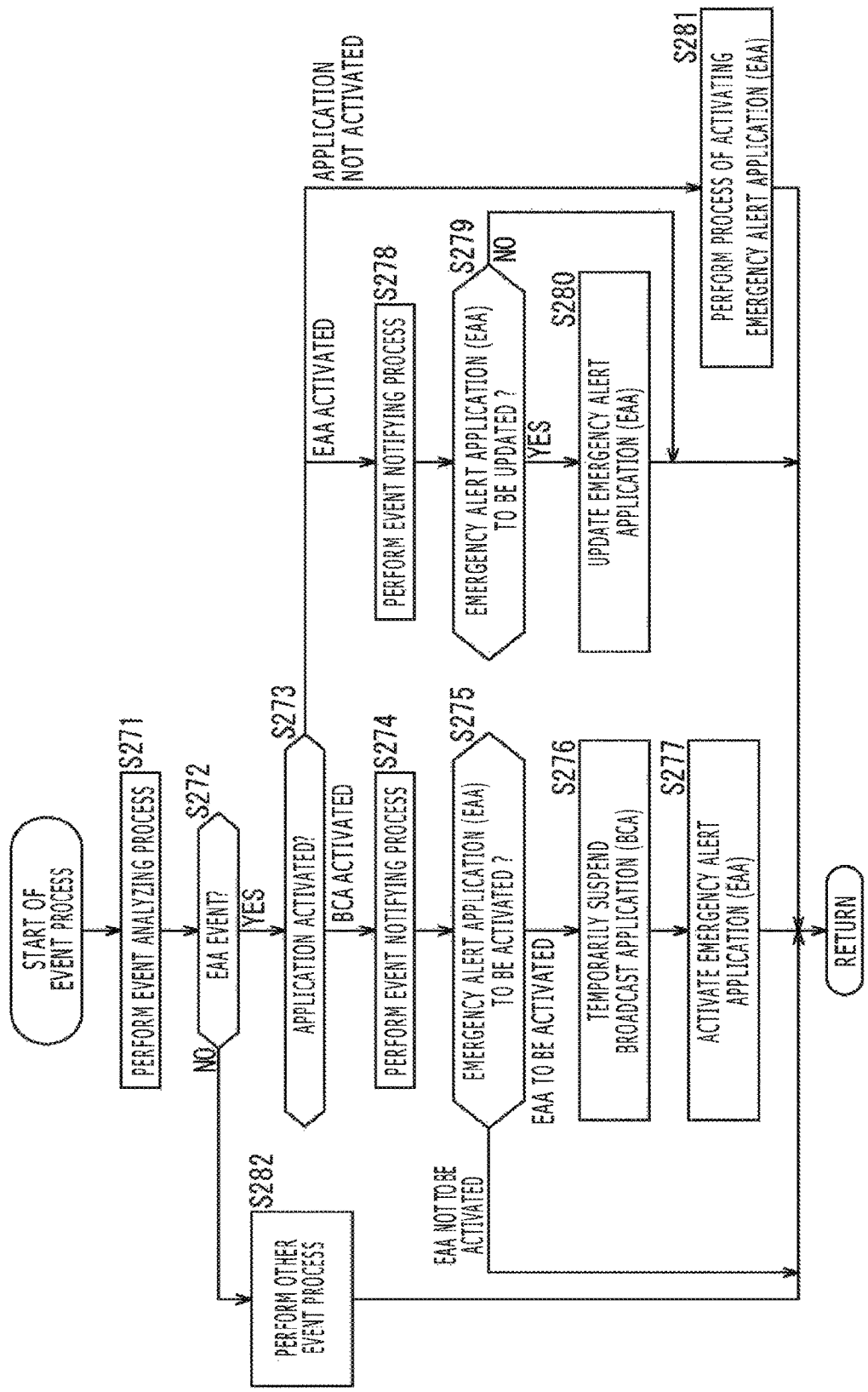
FIG. 28 is a flowchart illustrative of the flow of an event process.

Finally, details of the event process which corresponds to the processing of step S232 or S237 depicted in FIG. 24 will be described below with reference to the flowchart depicted in FIG. 28.

In step S271, the FW/HW unit 211 or the MW unit 213 performs an event analyzing process. In the event analyzing process, an event message placed in an event message box of a DASH segment or an event message placed in an EventStream element of an MPD is analyzed.

In step S272, the FW/HW unit 211 or the MW unit 213 determines whether the event message is an event message (EAA event) with respect to an emergency alert application (EAA) or not on the basis of the result of the analysis in step S271.

If it is decided that the event message is an EAA event in step S272, then processing goes to step S273. In step S273, the MW unit 213 or the browser 214 performs an application activation determining process. In the application activation determining process, it is determined whether a broadcast application (BCA) or an emergency alert application (EAA) is activated or not.

If it is decided that a broadcast application (BCA) is activated in step S273, then processing goes to step S274. In step S274, the MW unit 213 or the browser 214 performs an event announcing process. In the event announcing process, as described with reference to FIG. 20, if the broadcast application (BCA) has registered (an event of) an event message according to an addEventListener method, then a callback event is issued, and (an event of) an event message is announced to the broadcast application (BCA).

In step S275, the MW unit 213 or the browser 214 determines whether an emergency alert application (EAA) is to be activated or not on the basis of the result of the analysis in step S271. Incidentally, the broadcast application (BCA) may perform this activation determining process. It is possible here to determine whether an emergency alert application (EAA) is to be activated or not according to an instruction from the user or set information (e.g., settings such as a display target region, a display target item, etc.), for example.

If it is decided that an emergency alert application (EAA) is to be activated in step S275, then processing goes to step S276. In this case, the MW unit 213 issues an activation event for an emergency alert application (EAA) (EAA activation event).

In step S276, the browser 214 temporarily suspends or terminals the broadcast application (BCA) that is being activated according to the EAA activation event issued from the MW unit 213.

In step S277, the browser 214 acquires and activates an emergency alert application (EAA) transmitted as LCC contents according to the EAA activation event issued from the MW unit 213. The receiving apparatus 20 now displays on its screen emergency detailed information according to the emergency alert application (EAA), together with a character string of a burned-in text, in superposed relation to the video of a broadcast program.

If it is decided that an emergency alert application (EAA) is not to be activated in step S275, then the processing of steps S276 and S277 is skipped.

If it is decided that an emergency alert application (EAA) is being activated in step S273, then processing goes to step S278. In step S278, the MW unit 213 or the browser 214 performs an event announcing process. In the event announcing process, as described with reference to FIG. 20, if the emergency alert application (EAA) has registered (an event of) an event message according to an addEventListener method, then a callback event is issued, and (an event of) an event message is announced to the emergency alert application (EAA).

In step S279, the MW unit 213 or the browser 214 determines whether the emergency alert application (EAA) is to be updated or not on the basis of the result of the analysis in step S271. Incidentally, the emergency alert application (EAA) may perform this update determining process.

If it is decided that the emergency alert application (EAA) is to be updated in step S279, then processing goes to step S280. In this case, the MW unit 213 issues a transition event for the emergency alert application (EAA) (EAA transition event).

In step S280, the browser 214 updates the emergency alert application (EAA) according to the EAA transition event issued from the MW unit 213. For example, when an emergency alert application (EAA2) is activated while an emergency alert application (EAA1) is being activated, the information by the emergency alert application (EAA) makes a transition. The information by the emergency alert application (EAA1) is now updated, and the receiving apparatus 20 now displays on its screen the information by the emergency alert application (EAA2) (e.g., D44 in FIG. 9).

If it is decided that the emergency alert application (EAA) is not to be updated in step S279, then the processing of step S280 is skipped.

If it is decided that both a broadcast application (BCA) and an emergency alert application (EAA) have not been activated in step S273, processing goes to step S281.

In step S281, the MW unit 213 or the browser 214 performs a process of activating an emergency alert application (EAA) according to the result of the analysis in step S271. The receiving apparatus 20 thus displays on its screen emergency detailed information by the emergency alert application (EAA), together with a character string of a burned-in text, in superposed relation to the video of the broadcast program.

If it is decided that the event message is not an EAA event in step S272, then processing goes to step S282. In step S282, the MW unit 213, the browser 214, or the like performs an event process corresponding to another event message than an EAA event.

When the processing of step S277, S280, S281, or S282 is finished, processing goes back to the processing of step S232 or S237 depicted in FIG. 24, performing the processing subsequent thereto.

The flow of the event process has been described above.

<4. Modifications>

In the above description, ATSC (particularly, ATSC3.0) that is a system employed in the USA, etc. has been described as digital broadcasting standards. However, the present technology may be applied to ISDB (Integrated Services Digital Broadcasting) that is a system employed in Japan, etc. and DVB (Digital Video Broadcasting) that is a system employed in countries in Europe, etc. In the transmission system 1, the transmission path 80 is not limited to terrestrial wave broadcasts, but may be satellite broadcasts using broadcasting satellites (BS) and communication satellites (CS), or wired broadcasts using cables (CATV). Furthermore, in the above description, the emergency announcing system (EAS) in the USA has been described by way of example. However, the present technology may be applied to similar systems constructed in various countries.

The names of signaling data such as LLS, SLS, etc. referred to above are given by way of example, and other names may be used to call them. However, these different names are different formalities, and do not mean different substantial contents of signaling data. In case signaling data are described in markup languages such as XML, etc., the names of their elements and attributes are given by way of example, and other names may be employed. These different names are different formalities, and do not mean different substantial contents of those elements and attributes. Moreover, LCC (Locally Cached Content) may be referred to as NRT (Non Real Time) though the latter does not mean different substantial contents.

<5. The Configuration of a Computer>

The above sequence of processes may be hardware-implemented or software-implemented. If the sequence of processes is software-implemented, then software programs are installed in a computer. FIG. 29 is a diagram depicting a configurational example of the hardware of a computer that executes the above sequence of processes based on programs.

The computer, denoted by 900, includes a CPU (Central Processing Unit) 901, a ROM (Read Only Memory) 902, and a RAM (Random Access Memory) 903 that are connected to each other by a bus 904. An input/output interface 905 is connected to the bus 904. To the input/output interface 905, there are connected an input unit 906, an output unit 907, a recording unit 908, a communication unit 909, and a drive 910.

The input unit 906 includes a keyboard, a mouse, and a microphone, etc. The output unit 907 includes a display and a speaker, etc. The recording unit 908 includes a hard disk and a non-volatile memory, etc. The communication unit 909 includes a network interface, etc. The drive 910 drives a removable medium 911 such as a magnetic disk, an optical disk, a magneto-optical disk, a semiconductor memory, or the like.

In the computer 900 thus constructed, the CPU 901 loads programs stored in the ROM 902 or the recording unit 908, for example, through the input/output interface 905 and the bus 904 into the RAM 903 and executes the programs to perform the processes described above.

The programs run by the computer 900 (the CPU 901) can be recorded on and provided by the removable medium 911 as a package medium or the like, for example. The programs can also be provided through a wired or wireless transmission medium such as a local area network, the Internet, or a digital satellite broadcast.

In the computer 900, the programs can be installed in the recording unit 908 through the input/output interface 905 when the removable medium 911 is inserted into the drive 910. The programs can also be received by the communication unit 909 through a wired or wireless transmission medium and installed in the recording unit 908. The programs can alternatively be pre-installed in the ROM 902 or the recording unit 908.

The processing sequences that the computer performed according to the programs may not necessarily be carried out in chronological order in the order described above as the flowcharts. In other words, the processing sequences that the computer performed according to the programs include processing sequences executed parallel or independently (e.g., parallel processing sequences or object processing sequences). The programs may be processed by a single computer (processor) or may be processed in a distributed fashion by a plurality of computers.

Embodiments of the present technology are not limited to the above embodiment, and various changes may be made therein without departing from the scope of the present technology.

The present technology may have the following configurations:

(1) A receiving apparatus including:
a receiver that receives a digital broadcast signal; and
a processor that performs a process with respect to an emergency information application for presenting detailed information of emergency information on the basis of control information that is included in the digital broadcast signal and that includes information about the detailed information of the emergency information which needs to be announced urgently.

(2) The receiving apparatus according to (1), in which the control information includes at least one of items of information which include urgency, severity, target region, category, and priority of the emergency information; and
the processor determines whether the emergency information application is to be activated or not on the basis of the control information.

(3) The receiving apparatus according to (2), in which the processor:

displays selection information indicating whether the detailed information of the emergency information is to be presented or not on the basis of the control information; and activates the emergency information application if the detailed information of the emergency information is selected by a user so as to be presented.

(4) The receiving apparatus according to (2), in which the processor activates the emergency information application on the basis of set information set in advance by a user.

(5) The receiving apparatus according to any one of (2) through (4), in which the control information further includes a command for controlling a life cycle of the emergency information application; and the processor controls operation of the emergency information application on the basis of the control information.

(6) The receiving apparatus according to (5), in which the processor:

performs a control process for activating the emergency information application and temporarily suspending or terminating a broadcast application that is ordinarily executed when the broadcast application is activated if the command included in the control information indicates activation of the emergency information application and the emergency information application is activated; and performs a control process for terminating the emergency information application when the emergency information application is activated if the command included in the control information indicates termination of the emergency information application.

(7) The receiving apparatus according to (6), in which the processor performs a control process for resuming operation of the broadcast application that is being temporarily suspended when the broadcast application is being temporarily suspended if the command included in the control information indicates termination of the emergency information application.

(8) The receiving apparatus according to any one of (2) through (7), in which the processor performs a process with respect to the emergency information application at a predetermined timing on the basis of an event message included in the digital broadcast signal.

(9) The receiving apparatus according to (8), in which the event message is placed in an event stream element of an MPD (Media Presentation Description) prescribed by MPEG-DASH (Dynamic Adaptive Streaming over HTTP) or an event message box of a DASH segment.

(10) The receiving apparatus according to any one of (1) through (9), in which the digital broadcast signal is a digital broadcast signal according to an IP (Internet Protocol) transmission scheme; and the control information is placed in a payload of a UDP (User Datagram Protocol) packet included in an IP packet, and transmitted.

(11) A data processing method for a receiving apparatus, including the steps of:

the receiving apparatus receiving a digital broadcast signal; and the receiving apparatus performing a process with respect to an emergency information application for presenting detailed information of emergency information on the basis of control information that is included in the digital broadcast signal and that includes information about the detailed information of the emergency information which needs to be announced urgently.

(12) A transmitting apparatus including:

a generator that generates control information including information about detailed information of emergency information which needs to be announced urgently, the control information being used in a process with respect to an emergency information application for presenting the detailed information of the emergency information; and a transmitter that transmits the generated control information as included in a digital broadcast signal.

(13) The transmitting apparatus according to (12), in which the control information includes at least one of items of information which include urgency, severity, target region, category, and priority of the emergency information.

(14) The transmitting apparatus according to (13), in which the control information further includes a command for controlling a life cycle of the emergency information application.

(15) The transmitting apparatus according to (13) or (14), in which the generator generates an event message for performing a process with respect to the emergency information application at a predetermined timing; and the transmitter transmits the generated event message as included in the digital broadcast signal.

(16) The transmitting apparatus according to (15), in which the event message is placed in an event stream element of an MPD prescribed by MPEG-DASH or an event message box of a DASH segment.

(17) The transmitting apparatus according to any one of (12) through (16), in which the digital broadcast signal is a digital broadcast signal according to an IP transmission scheme; and the control information is placed in a payload of a UDP packet included in an IP packet, and transmitted.

(18) A data processing method for a transmitting apparatus, including the steps of:

the transmitting apparatus generating control information including information about detailed information of emergency information which needs to be announced urgently, the control information being used in a process with respect to an emergency information application for presenting the detailed information of the emergency information; and the transmitting apparatus transmitting the generated control information as included in a digital broadcast signal.

REFERENCE SIGNS LIST

1 Transmission system, 10-1, 10-2, 10 Transmitting apparatus, 20, 20-1, 20-2, 20-3 Receiving apparatus, 30 Radio tower, 40 EA server, 80 Transmission path, 90 Communication link, 101 EA parser, 102 Live contents acquiring unit, 103 Storage, 104 Component processing unit, 105 Signaling data processing unit, 106 LCC processing unit, 107 Encoder, 108 Multiplexer, 109 Modulator, 110 RF unit, 201 RF unit, 202 Demodulator, 203 Processor, 204 Output unit, 205 Communication I/F, 211 FW/HW unit, 212 Component processing unit, 213 MW unit, 214 Browser, 221 Demultiplexer, 222 Decoder, 231 Parser, 232 Filter, 251 Broadcasting and communication I/F, 252 Application execution environment/middleware, 900 Computer, 9C1 CPU

The invention claimed is:

1. A receiving apparatus comprising:
a receiver that receives a digital broadcast signal;
a demodulator that performs a demodulating process on the signal supplied from the receiver; and
circuitry that (i) determines whether signaling data stored in a payload of at least one IP packet of the digital broadcast signal is updated, and (ii) when the signaling data is updated, performs a process with respect to an emergency information application for presenting detailed information of emergency information on the basis of control information that is included in the signaling data and that includes information about the detailed information of the emergency information which needs to be announced urgently, wherein the control information includes information indicating a degree of priority of an emergency information as a numerical value, the degree of priority is lowest for the numerical value 0.

2. The receiving apparatus according to claim 1, wherein the control information includes at least one of items of information which include urgency, severity, target region, category, and priority of the emergency information; and the circuitry determines whether the emergency information application is to be activated or not on the basis of the control information.

3. The receiving apparatus according to claim 2, wherein the circuitry:

displays selection information indicating whether the detailed information of the emergency information is to be presented or not on the basis of the control information; and activates the emergency information application if the detailed information of the emergency information is selected by a user so as to be presented.

4. The receiving apparatus according to claim 2, wherein the circuitry activates the emergency information application on the basis of set information set in advance by a user.

5. The receiving apparatus according to claim 2, wherein the control information further includes a command for controlling a life cycle of the emergency information application; and the circuitry controls operation of the emergency information application on the basis of the control information.

6. The receiving apparatus according to claim 5, wherein the circuitry:

performs a control process for activating the emergency information application and temporarily suspending or terminating a broadcast application that is ordinarily executed when the broadcast application is activated if the command included in the control information indicates activation of the emergency information application and the emergency information application is activated; and performs a control process for terminating the emergency information application when the emergency information application is activated if the command included in the control information indicates termination of the emergency information application.

7. The receiving apparatus according to claim 6, wherein the circuitry performs a control process for resuming operation of the broadcast application that is being temporarily suspended when the broadcast application is being temporarily suspended if the command included in the control information indicates termination of the emergency information application.

8. The receiving apparatus according to claim 2, wherein the circuitry performs a process with respect to the emergency information application at a predetermined timing on the basis of an event message included in the digital broadcast signal.

9. The receiving apparatus according to claim 8, wherein the event message is placed in an event stream element of an MPD (Media Presentation Description) prescribed by MPEG-DASH (Dynamic Adaptive Streaming over HTTP) or an event message box of a DASH segment.

10. The receiving apparatus according to claim 1, wherein the signaling data is determined to be updated based on an analysis of at least one of a type and version of the signaling data.

11. A data processing method for a receiving apparatus, comprising the steps of:

the receiving apparatus receiving a digital broadcast signal;

the receiving apparatus performing a demodulating process on the signal supplied from the receiver; and the receiving apparatus (i) determining whether signaling data stored in a payload of at least one IP packet of the digital broadcast signal is updated, and (ii) when the signaling data is updated, performing a process with respect to an emergency information application for presenting detailed information of emergency information on the basis of control information that is included in the signaling data and that includes information about the detailed information of the emergency information which needs to be announced urgently, wherein the control information includes information indicating a degree of priority of an emergency information as a numerical value, the degree of priority is lowest for the numerical value 0.

12. A transmitting apparatus comprising:

a generator that generates control information including information about detailed information of emergency information which needs to be announced urgently, the control information being used in a process with respect to an emergency information application for presenting the detailed information of the emergency information; and a transmitter that transmits the generated control information as included in a digital broadcast signal, wherein the control information is included in signaling data stored in a payload of at least one IP packet of the digital broadcast signal, wherein an update to the signaling data causes the process to be performed in a receiving apparatus that receives the digital broadcast signal, and wherein the control information includes information indicating a degree of priority of an emergency information as a numerical value, the degree of priority is lowest for the numerical value 0.

13. The transmitting apparatus according to claim 12, wherein the control information includes at least one of items of information which include urgency, severity, target region, category, and priority of the emergency information.

14. The transmitting apparatus according to claim 13, wherein the control information further includes a command for controlling a life cycle of the emergency information application.

15. The transmitting apparatus according to claim 13, wherein the generator generates an event message for performing a process with respect to the emergency information application at a predetermined timing; and the transmitter transmits the generated event message as included in the digital broadcast signal.

16. The transmitting apparatus according to claim 15, wherein the event message is placed in an event stream element of an MPD prescribed by MPEG-DASH or an event message box of a DASH segment.

17. A data processing method for a transmitting apparatus, comprising the steps of:
- the transmitting apparatus generating control information including information about detailed information of emergency information which needs to be announced urgently, the control information being used in a process with respect to an emergency information application for presenting the detailed information of the emergency information; and
- the transmitting apparatus transmitting the generated control information as included in a digital broadcast signal,
- wherein the control information is included in signaling data stored in a payload of at least one IP packet of the digital broadcast signal,
- wherein an update to the signaling data causes the process to be performed in a receiving apparatus that receives the digital broadcast signal, and
- wherein the control information includes information indicating a degree of priority of an emergency information as a numerical value, the degree of priority is lowest for the numerical value 0.

* * * * *